US008214502B2

(12) United States Patent
Muto et al.

(10) Patent No.: US 8,214,502 B2
(45) Date of Patent: Jul. 3, 2012

(54) COMMUNICATION PATH SETUP APPARATUS, COMMUNICATION PATH SETUP PROGRAM, AND STORAGE MEDIUM STORING THE PROGRAM

(75) Inventors: Takaaki Muto, Hamakita (JP);
Fumiteru Takeda, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1910 days.

(21) Appl. No.: 11/083,690

(22) Filed: Mar. 18, 2005

(65) Prior Publication Data
US 2005/0220038 A1    Oct. 6, 2005

(30) Foreign Application Priority Data

Mar. 18, 2004  (JP) ................................ 2004-078499
Mar. 19, 2004  (JP) ................................ 2004-081149

(51) Int. Cl.
*G06F 15/16* (2006.01)
(52) U.S. Cl. ...................................................... 709/227
(58) Field of Classification Search .................. 709/227, 709/220
See application file for complete search history.

(56) References Cited

U.S. PATENT DOCUMENTS 6,968,307 B1 * 11/2005 Chrysanthakopoulos ...... 703/27
2001/0021188 A1   9/2001 Fujimori et al.

FOREIGN PATENT DOCUMENTS

| EP | 1 117 226 A2 | 7/2001 |
| JP | 10011379 | 1/1998 |
| JP | 2001 203732 | 7/2001 |

OTHER PUBLICATIONS mLan Patchbay Owner's Manual, Yamaha Corporation, 2000, pp. 1-17.

* cited by examiner

*Primary Examiner* — John MacIlwinen
(74) *Attorney, Agent, or Firm* — Morrison & Foerster LLP

(57) ABSTRACT

A communication path setup apparatus which is capable of causing newly added nodes to take over information on configurations of disconnected nodes as they are. An existing piece of communication equipment of a music system is selected. A non-existing piece of communication equipment having a predetermined relationship with the selected existing piece of communication equipment is searched for, and the found non-existing piece of communication equipment is presented as designatable communication equipment. Configuration information on a designated non-existing piece of communication equipment is reflected on configuration information on the selected existing piece of communication equipment.

4 Claims, 14 Drawing Sheets

FIG. 3

| NODE ID | DISABLE | GUID | MODEL ID | ... | MIDI-IN | MIDI-OUT | AUDIO-IN | AUDIO-OUT |
|---|---|---|---|---|---|---|---|---|
| 01 | 0 | 00010001 | 0001 | | 16 | 16 | 8 | 8 |
| 02 | 0 | 00010002 | 0001 | | 16 | 16 | 0 | 0 |
| 03 | 1 | 00020001 | 0002 | | 16 | 16 | 16 | 16 |
| 04 | 0 | 00030001 | 0003 | | 16 | 16 | 8 | 8 |

FIG. 4

| COMMUNICATION SOURCE | COMMUNICATION DESTINATION |
|---|---|
| (01)(OUT1)(・・・) | (02)(IN1)(・・・) |
| (01)(OUT2)(・・・) | (02)(IN2)(・・・) |
| (01)(OUT3)(・・・) | NONE |
| (02)(OUT1)(・・・) | (04)(IN1)(・・・) |
| (02)(OUT2)(・・・) | (05)(IN1)(・・・) |

FIG. 9

ATTRIBUTE INFORMATION

| GUID | MODEL ID | DISABLE | ··· | MIDI-IN | MIDI-OUT |
|---|---|---|---|---|---|
| 0001 | 01 | 0 | ··· | 0 | 0 |
| 0002 | 02 | 0 | ··· | 8 | 8 |
| 0003 | 02 | 1 | ··· | 4 | 8 |
| 0004 | 03 | 0 | ··· | 16 | 16 |

FIG. 10

CONNECTION INFORMATION

| COMMUNICATION SOURCE (from) | | COMMUNICATION DESTINATION (to) | |
|---|---|---|---|
| GUID | LOGICAL TERMINAL | GUID | LOGICAL TERMINAL |
| 0001 | MIDI-OUT1 | 0002 | MIDI-IN1 |
| 0001 | MIDI-OUT2 | 0002 | MIDI-IN2 |
| ⋮ | ⋮ | ⋮ | ⋮ |
| 0002 | MIDI-OUT1 | 0003 | MIDI-IN1 |
| ⋮ | ⋮ | ⋮ | ⋮ |
| 0004 | MIDI-OUT16 | NONE | NONE |

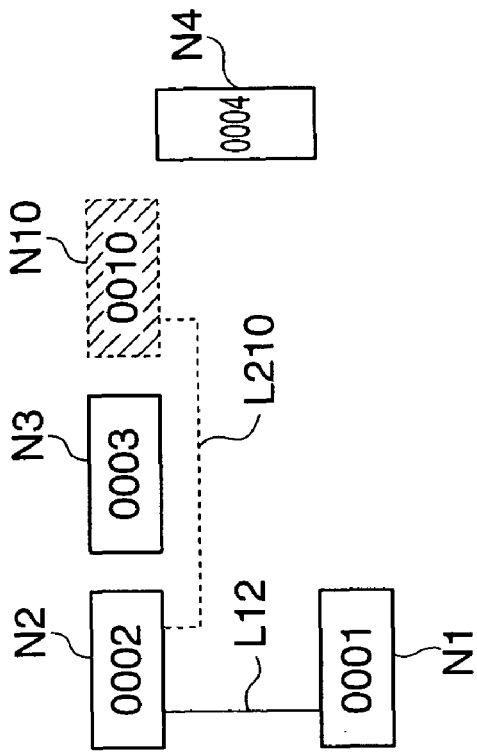
FIG. 16A DISPLAY AFTER EXECUTION OF FULLY FILE-BASED SETUP BY READING SETUP DATA FILE
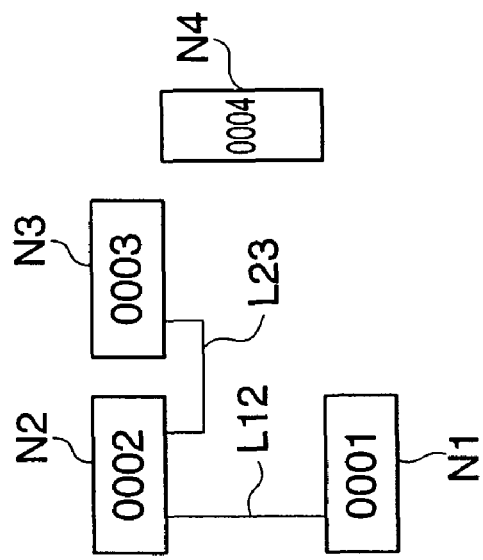
FIG. 16B DISPLAY AFTER EXECUTION OF FILE-AS-TEMPLATE SETUP BY READING SETUP DATA FILE

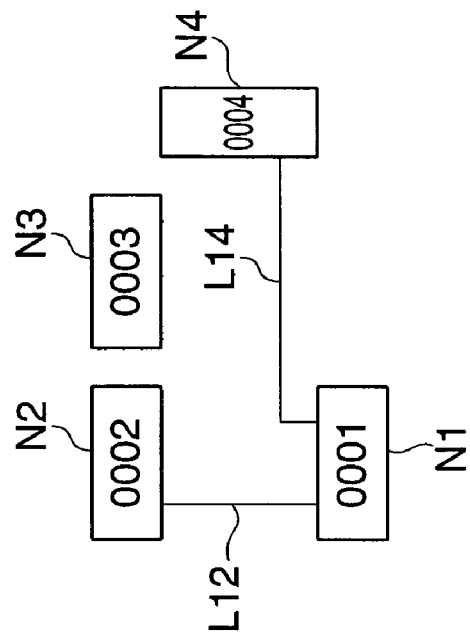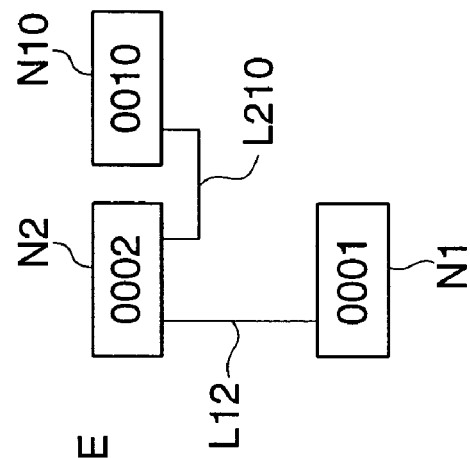
FIG. 16C INITIAL DISPLAY
FIG. 16D CONTENTS OF SETUP DATA FILE

COMMUNICATION PATH SETUP APPARATUS, COMMUNICATION PATH SETUP PROGRAM, AND STORAGE MEDIUM STORING THE PROGRAM

BACKGROUND OF THE INVENTION

1. Field of the Invention

The present invention relates to a communication path setup apparatus that sets up communication paths for a plurality of pieces of communications equipment connected to each other via communication lines, a program for implementing a communication path setup method, and a storage medium storing the program, and also relates to a communication path setup apparatus that sets up communication paths for music data (logical connections) between a plurality of pieces of equipment connected to each other over a network to constitute a music system, a program for implementing a communication path setup method, and a storage medium storing the program. More particularly, the present invention relates to a communication path setup apparatus that enables a user to easily recognize (distinguish) between an actual music system configuration based on actual pieces of equipment existing in a logical music system configuration (logically handled by a communication path setup apparatus and program) based on a setup data file or the like, and an imaginary music system configuration based on imaginary pieces of equipment not existing in the logical music system configuration, a communication path setup program, and a storage medium storing the program.

Throughout the present specification, a system configuration of equipment which is physically connected to an actual music system and therefore actually existing therein is referred to as "the actual music system configuration", and a system configuration of equipment which is not physically connected to the present music system and therefore not actually existing therein is referred to as "the imaginary music system configuration".

2. Description of the Related Art

Conventionally, application software has been known which is capable of setting up communication paths for a plurality of pieces of communications equipment connected to each other via communication lines.

There has been known application software of this kind which makes it possible to set up paths for communicating MIDI (Musical Instrument Digital Interface) signals and audio signals between a plurality of pieces of communications equipment (hereinafter referred to as "the nodes") connected to each other via communication lines, more particularly, to set up paths defining from which MIDI signal output terminal of which node, a MIDI signal is to be input to which MIDI signal input terminal of which node and defining from which MIDI signal output terminal the input MIDI signal is to be output to which MIDI signal input terminal (communication paths for audio signals are also defined in the same manner) (see e.g. manuals of software applications called mLAN, and Patchbay).

In this conventional software, all the communication terminals (MIDI signal input and output terminals and audio signal input and output terminals) of all nodes connected to each other are displayed in a list, and when the user selects a communication source terminal and a communication destination terminal from this list, a communication path is set up between the selected terminals. When the user disconnects a communication line connected to a certain node, all pieces of information (including information on the communication paths) on settings or configurations of the node are erased.

Further, it has been known to configure a music system which is capable of transmitting and receiving music data, such as audio signals and MIDI signals, in real time, over a network conforming to a predetermined communication standard (IEEE1394 standard) compatible with multimedia, by making use of a communication standard (registered trademark "mLAN") developed by the present assignee. This music system is implemented by physically connecting a control apparatus, such as a personal computer, and various pieces of musical equipment (a synthesizer, a tone generator, a recorder, mixer, and so forth) to each other (i.e. connecting IEEE1394 connectors provided in the equipment by cables). A communication path setup apparatus (software) (hereinafter, referred to as "the patchbay") for setting up communication paths (logical connections) of desired music data between pieces of equipment (nodes) connected to each other over such a network is disclosed in Japanese Laid-Open Patent Publication (Kokai) No. 2001-203732. In the music system described above, music data is transmitted between the pieces of equipment according to the logical connections set up by the patchbay.

The patchbay displays a list of communication terminals (logical terminals) for music data provided in a plurality of nodes constituting a music system, and enables a user to logically connect (electrically connect) one or more communication sources (communication terminal(s) for outputting music data) selected from the communication terminals in the list and one or more communication destinations (communication terminal(s) for inputting the music data) selected from the same. Information on the connections between the selected terminals can be stored as a setup data file. One setup data file stores the connections concerning all nodes constituting one logical music system configuration. The logical music system configuration includes an actual music system configuration based on the existing or actual nodes and an imaginary music system configuration based on the non-existing or imaginary nodes.

When an instruction for reading the setup data file (hereinafter referred to as "the Open instruction") is issued, the connections of logical terminals stored in the setup data file are read as a logical music system configuration, and displayed in a list (in place of the list displayed hitherto). At this time, the read connections of logical terminals are not reflected on the existing nodes, but only displayed as a list of contents of the logical music system configuration. To cause the logical music system configuration to be reflected on the existing or actual nodes, it is necessary to issue an Apply instruction. When the Apply instruction is issued, information on the connections displayed in the list is transmitted to each of the nodes whereby it is reflected on the node. At this time, the displayed list is not changed, and the read connections of logical terminals are not reflected on nodes which are defined in the list but do not actually exist in the system so that the nodes remain displayed as they are in the list. This produces a discrepancy between the logical music system configuration displayed in the list and the actual music system configuration based on the actual connections of the existing nodes on which the logical music system configuration is reflected. To display the list of the actual music system configuration, it is necessary to issue an Update instruction. When the Update instruction is issued, the patchbay receives information on actual connections of each node stored therein from the node, to display the actual connections in a list. At this time, the nodes displayed but not actually existing before the Update instruction is issued are erased from the displayed list. This causes the logical music system configuration in the list displayed after erasing the non-existing nodes (hereinafter referred to as "the list after the Update instruction") and the actual music system to completely match each other. That is, the list that should originally displays the logical music system configuration displays the actual music system configuration.

However, in the conventional software described hereinbefore, the information on settings or configurations of the disconnected node is completely erased, and therefore when it is desired for a newly added node to take over the information, that is, when it is desired to apply the information as it is to the newly added node, the user has to manually input the same settings set to the disconnected node to the newly added node one by one, which is troublesome.

Further, in the patchbay described above, when the user desires to recognize (discriminate between) the actual music system configuration based on the existing nodes and the imaginary music system configuration based on the non-existing nodes, in the logical music system configuration based on the read setup data file, it is only necessary to compare the logical music system configuration displayed in a list in response to the Open instruction and the actual music system configuration displayed in a list in response to the Update instruction. Conventionally, however, as described hereinabove, the logical music system configuration displayed in a list in response to the "Open" instruction, which is comprised of the actual music system configuration and the imaginary music system configuration, is rewritten into a music system configuration comprised of only the actual music system configuration when the Update instruction is issued. Therefore, the user needs to store a part of the logical music system configuration which corresponds to the imaginary music system configuration (or a part of the same corresponding to the actual music system configuration to be updated) in some way or other. This makes the comparison operation very complicated.

Further, to cause existing nodes to take over the connections of the non-existing nodes contained in the logical music system configuration read from the setup data file in response to the Open instruction, that is, to apply the connections of the non-existing nodes to the existing nodes, it is necessary to store information on the connections of the non-existing nodes in some way or other, and after the actual music system configuration is displayed in a list in response to the Update instruction, based on the stored information, the connections of the non-existing nodes have to be manually input one by one to the existing or actual nodes to which the connections of the non-existing nodes are desired to be applied, which is a troublesome operation.

SUMMARY OF THE INVENTION

It is a first object of the present invention to provide a communication path setup apparatus which is capable of causing newly added nodes to take over information on configurations of disconnected nodes as they are, a program for implementing a communication path setup method, and a storage medium storing the program.

It is a second object of the present invention to provide a communication path setup apparatus which makes it possible to easily recognize an actual music system configuration based on existing or actual nodes and an imaginary music system configuration based on non-existing or imaginary nodes, in a logical music system configuration based on a read setup data file, and cause the existing or actual nodes to easily and promptly take over the configurations (connections) of the imaginary nodes of the logical music system configuration read from the setup data file, a program for implementing a communication path setup method, and a storage medium storing the program.

To attain the first object, in a first aspect of the present invention, there is provided a communication path setup apparatus for a system including a plurality of pieces of communication equipment connected to each other via communication lines, comprising a first holding device that holds configuration information on at least one piece of first communication existing in the system, a second holding device that holds configuration information on at least one piece of second communication equipment not existing in the system, a selecting device that selects one piece of the first communication equipment, a searching device that searches for any piece of the second communication equipment having a predetermined relationship with the piece of the first communication equipment selected by the selecting device, a presenting device that presents at least one piece of the second communication equipment found through the search by the searching device as designatable communication equipment, a designating device that designates one piece of the second communication equipment presented by the presenting device, and a reflecting device that causes configuration information on the piece of the second communication equipment designated by the designating device to be reflected on configuration information on the selected piece of the first communication equipment.

With the arrangement of the first aspect of the present invention, one piece of first communication equipment existing in a system including a plurality of pieces of communication equipment connected to each other via communication lines is selected, and at least one piece of second communication equipment having a predetermined relationship with the selected piece of the first communication equipment, if any, is retrieved to present the retrieved piece(s) of the second communication equipment as designatable communication equipment. One piece of the presented second communication equipment is designated. Configuration information on the designated piece of the second communication equipment is reflected on the configuration information on the selected piece of the first communication equipment. As a result, by simple operations of selecting a piece of the first communication equipment and designating a piece of the second communication equipment, it is possible to cause the information on configurations of the designated piece of the second communication equipment to be reflected on the information on configurations of the selected piece of the first communication equipment.

Preferably, the communication path setup apparatus further comprises a determining device that determines whether or not the selected piece of the first communication equipment is unconnected, and a control device that is operable when the determining device determines that the selected piece of the first communication equipment is unconnected, to cause the searching device, the presenting device, the designating device, and the reflecting device to perform respective processes thereof, and operable when the determining device determines that the selected piece of the first communication equipment is not unconnected, to inhibit the searching device, the presenting device, the designating device, and the reflecting device from performing the respective processes.

Preferably, the communication path setup apparatus further comprises a display device that displays the first communication equipment in a first mode and the second communication equipment in a second mode, and connections between a plurality of pieces of the first communication equipment.

Preferably, the communication path setup apparatus further comprises an erasing device that erases the configuration information on the designated piece of the second communication equipment.

Preferably, the communication path setup apparatus further comprises a setting device that sets at least one piece of the plurality of pieces of communication equipment, which is disconnected from the system, to at least one piece of the second communication equipment.

Preferably, the designating device designates a dragged and dropped piece of the second communication equipment presented by the presenting device.

To attain the first object, in a second aspect of the present invention, there is provided a program for causing a computer to execute a communication path setup method for a system including a plurality of pieces of communication equipment connected to each other via communication lines, comprising a first holding module for holding configuration information on at least one piece of first communication equipment existing in the system, a second holding module for holding configuration information on at least one piece of second communication equipment not existing in the system, a selecting module for selecting one of the first communication equipment, a searching module for searching for any piece of the second communication equipment having a predetermined relationship with the piece of the first communication equipment selected by the selecting module, a presenting module for presenting at least one piece of the second communication equipment found through the search by the searching module as designatable communication equipment, a designation module for designating one piece of the second communication equipment presented by the presenting module, and a reflecting module for causing configuration information on the piece of the second communication equipment designated by the designating module to be reflected on configuration information on the selected piece of the first communication equipment.

To attain the first object, in a third aspect of the present invention, there is provided a storage medium storing a program for causing a computer to execute a communication path setup method for a system including a plurality of pieces of communication equipment connected to each other via communication lines, the program comprising a first holding module for holding configuration information on at least one piece of first communication equipment existing in the system, a second holding module for holding configuration information on at least one piece of second communication equipment not existing in the system, a selecting module for selecting one of the first communication equipment, a searching module for searching for any piece of the second communication equipment having a predetermined relationship with the piece of the first communication equipment selected by the selecting module, a presenting module for presenting at least one piece of the second communication equipment found through the search by the searching module as designatable communication equipment, a designation module for designating one piece of the second communication equipment presented by the presenting module, and a reflecting module for causing configuration information on the piece of the second communication equipment designated by the designating module to be reflected on configuration information on the selected piece of the first communication equipment.

To attain the second object, in a fourth aspect of the present invention, there is provided communication path setup apparatus comprising a display device that displays a plurality of nodes constituting one logical music system, and communication paths defined by logical connections between the nodes, a storage device that stores a plurality of setup data files, each comprising at least attribute information and connection information on each of the nodes constituting the one logical music system, in association with respective different music system configurations, a reading device that reads one of the stored setup data files, a comparing device that compares each of the nodes of one of the music system configurations defined by the read setup data file with the displayed nodes of the one logical music system, a changing device that changes the attribute information and the connection information on one of the displayed nodes of the one logical music system according to the attribute information and the connection information on one node defined in a corresponding one of the setup data files and found by the comparison to match the one of the displayed nodes of the one logical music system, and an adding device that adds at least one node defined in a corresponding one of the setup data files and found by the comparison not to match any of the displayed nodes of the one logical music system, to a configuration of the one logical music system, as an imaginary node to be displayed in a special mode.

With the arrangement of the fourth embodiment of the present invention, in the logical music system configuration based on the read setup data file, it is possible to display the actual music system configuration based on the existing or actual nodes and the imaginary music system configuration based on the non-existing or imaginary nodes, simultaneously and in a manner enabling the user to visually discriminate between the two music system configurations. As a result, the user can easily recognize (discriminate) between the imaginary and actual music system configurations included in the logical music system configuration. Further, when the setup data file has been read out, it is possible to cause ones of existing nodes which satisfy predetermined conditions to automatically take over the configurations on (the connections of) non-existing nodes defined in the logical music system configuration based on the read-out setup data file. As a result, it is possible to obtain the advantageous effects of causing the existing nodes to easily and promptly take over the configurations on (the connections of) the imaginary nodes of the logical music system configuration read from the setup data file.

Preferably, the communication path setup apparatus comprises a searching device that searches for at least one similar node in unused nodes of the configuration of the one logical music system, the unused nodes being not logically connected to any other node of the configuration of the one logical music system, before the adding device adds the at least one node defined in the corresponding one of the setup data files and found by the comparison not to match any of the displayed nodes of the one logical music system, to the configuration of the one logical music system, as an imaginary node to be displayed in a special mode, and wherein when the at least one similar node is found by the searching device, the changing device changes the attribute information and the connection information on the at least one similar node according to the attribute information and the connection information on the at least one node found not to match any of the displayed nodes of the one logical music system, and when the at least one similar node is not found by the searching device, the adding device adds the at least one node found not to match any of the displayed nodes of the one logical music system, to the configuration of the one logical music system, as the imaginary node displayed in the special mode.

More preferably, the storage device stores instructing information for instructing whether or not to execute the search for at least one similar node by the search device, for each of the setup data files.

Preferably, the display device displays the plurality of nodes in blocks, and the communication paths in lines.

Preferably, the display device displays actually existing ones of the plurality of nodes constituting the one logical music system, the actually existing ones existing in an actual music system, in a first mode, and imaginary ones of the plurality of nodes constituting the one logical music system, the imaginary ones not existing in the actual music system, in a second mode.

More preferably, the communication path setup apparatus further comprises an acquisition device that acquires the attribute information and the connection information on the actually existing nodes existing in the actual music system, and the display device displays at least one node disconnected from the actual music system, in the second mode, according to the attribute information and the connection information acquired by the acquisition device.

Preferably, the communication path setup apparatus further comprises a control device responsive to an instructing operation performed on at least one of the nodes or at least one of the communication paths in the one logical music system displayed on the display device, for erasing the at least one node or changing the at least one communication path in the one logical music system.

To attain the second object, in a fifth aspect of the present invention, there is provided a program for causing a computer to execute a communication path setup method, comprising a display module for displaying a plurality of nodes constituting one logical music system, and communication paths defined by logical connections between the nodes, a storage module for storing a plurality of setup data files, each comprising at least attribute information and connection information on each of the nodes constituting the one logical music system, in association with respective different music system configurations, a reading module for reading one of the stored setup data files, a comparing module for comparing each of the nodes of one of the music system configurations defined by the read setup data file with the displayed nodes of the one logical music system, a changing module for changing the attribute information and the connection information on one of the displayed nodes of the one logical music system according to the attribute information and the connection information on one node defined in a corresponding one of the setup data files and found by the comparison to match the one of the displayed nodes of the one logical music system, and an adding module for adding at least one node defined in a corresponding one of the setup data files and found by the comparison not to match any of the displayed nodes of the one logical music system, to a configuration of the one logical music system, as an imaginary node to be displayed in a special mode.

To attain the second object, in a sixth aspect of the present invention, there is provided a storage medium storing a program for causing a computer to execute a communication path setup method, the program comprising a display module for displaying a plurality of nodes constituting one logical music system, and communication paths defined by logical connections between the nodes, a storage module for storing a plurality of setup data files, each comprising at least attribute information and connection information on each of the nodes constituting the one logical music system, in association with respective different music system configurations, a reading module for reading one of the stored setup data files, a comparing module for comparing each of the nodes of one of the music system configurations defined by the read setup data file with the displayed nodes of the one logical music system, a changing module for changing the attribute information and the connection information on one of the displayed nodes of the one logical music system according to the attribute information and the connection information on one node defined in a corresponding one of the setup data files and found by the comparison to match the one of the displayed nodes of the one logical music system, and an adding module for adding at least one node defined in a corresponding one of the setup data file and found by the comparison not to match any of the displayed nodes of the one logical music system, to a configuration of the one logical music system, as an imaginary node to be displayed in a special mode.

The above and other objects, features, and advantages of the invention will become more apparent from the following detailed description taken in conjunction with the accompany drawings.

BRIEF DESCRIPTION OF THE DRAWINGS

FIG. 3 is a diagram showing a data format of attribute information on nodes, which is stored in an attribute information storage area;

FIG. 4 is a diagram showing a data format of connection information on nodes, which is stored in a connection information storage area;

FIG. 9 is a diagram showing a data format of attribute information;

FIG. 10 is a diagram showing a data format of connection information;

FIG. 16A is a diagram showing how a music system configuration screen is displayed after the fully file-based setup process is performed;

FIG. 16B is a diagram showing how a music system configuration screen displayed after the file-as-template setup process is performed;

FIG. 16C is a diagram showing an initial screen displayed before the setup data file is read; and FIG. 16D is a diagram showing contents of the setup data file.

DETAILED DESCRIPTION OF THE PREFERRED EMBODIMENTS

The present invention will now be described in detail with reference to the drawings showing preferred embodiments thereof.

Figure 1:
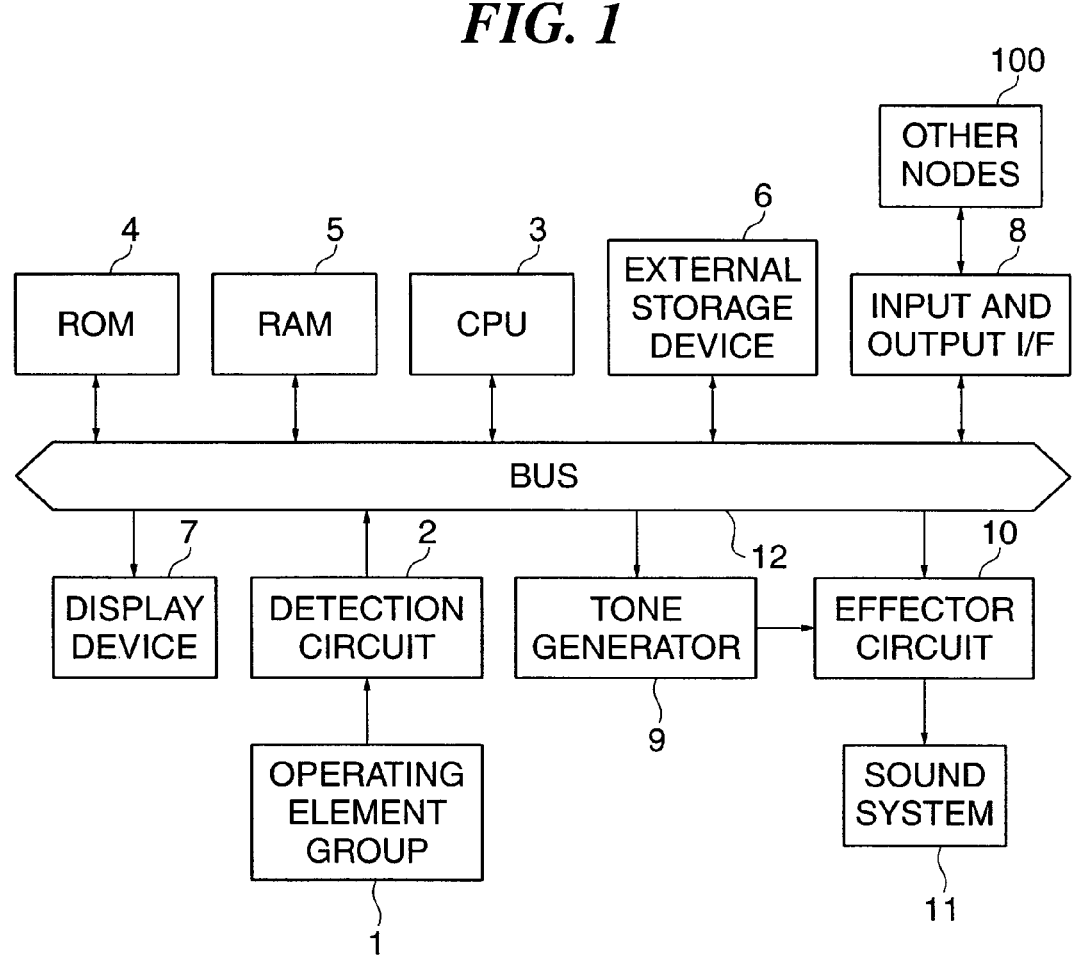
FIG. 1 is a block diagram schematically showing the arrangement of a communication path setup apparatus according to a first embodiment of the present invention.

FIG. 1 is a block diagram schematically showing the arrangement of a communication path setup apparatus according to a first embodiment of the present invention.

As shown in FIG. 1, the communication path setup apparatus according to the present embodiment is comprised of an operating element group 1 consisting of a plurality of operating elements, including a character input keyboard, a pointing device, such as a mouse, and various switches, a detection circuit 2 that detects operative states of the operating elements of the operating element group 1, a CPU 3 that performs the overall control of the apparatus, a ROM 4 that stores control programs executed by the CPU 3, various table data, and so forth, a RAM 5 that temporarily stores music data, various pieces of input information, computation results, and so forth, an external storage device 6 that stores various application programs including the control programs, various music data, various other data, and the like, a display device 7 that displays various pieces of information, including a liquid crystal display (LCD) and light emitting diodes (LEDs), an input and output interface (I/F) 8 that receives and transmits MIDI signals and audio signals, a tone generator 9 that converts the stored music data or the like into a tone signal, an effector circuit 10 that imparts various effects to the tone signal from the tone generator 9, and a sound system 11 that converts the tone signal into sound, which is comprised e.g. of a DAC (Digital-to-Analog Converter), an amplifier, and speakers.

The components 2 to 10 are connected to each other via a bus 12, with the input and output I/F 8 connected to other nodes 100, the tone generator 9 to the effector circuit 10, and the effector circuit 10 to the sound system 11.

The external storage device 6 is implemented e.g. by a flexible disk drive (FDD), a hard disk drive (HDD), a CD-ROM drive, and a magneto-optical disk (MO). The external storage device 6 can also store the control programs executed by the CPU 3, and when the control programs are not stored in the ROM 4, they may be stored in the external storage device 6 in advance, and read into the RAM 5, whereby the CPU 3 is caused to perform the same operations as performed when the control programs are stored in the ROM 4. With this configuration, it is possible to easily perform addition and version update of the control programs.

As can be seen from the arrangement described above, the communication path setup apparatus according to the present embodiment is implemented by a general-purpose personal computer. However, this is not limitative, but it may be implemented by a dedicated apparatus composed of the minimum elements that can execute the present invention.

Figure 2:
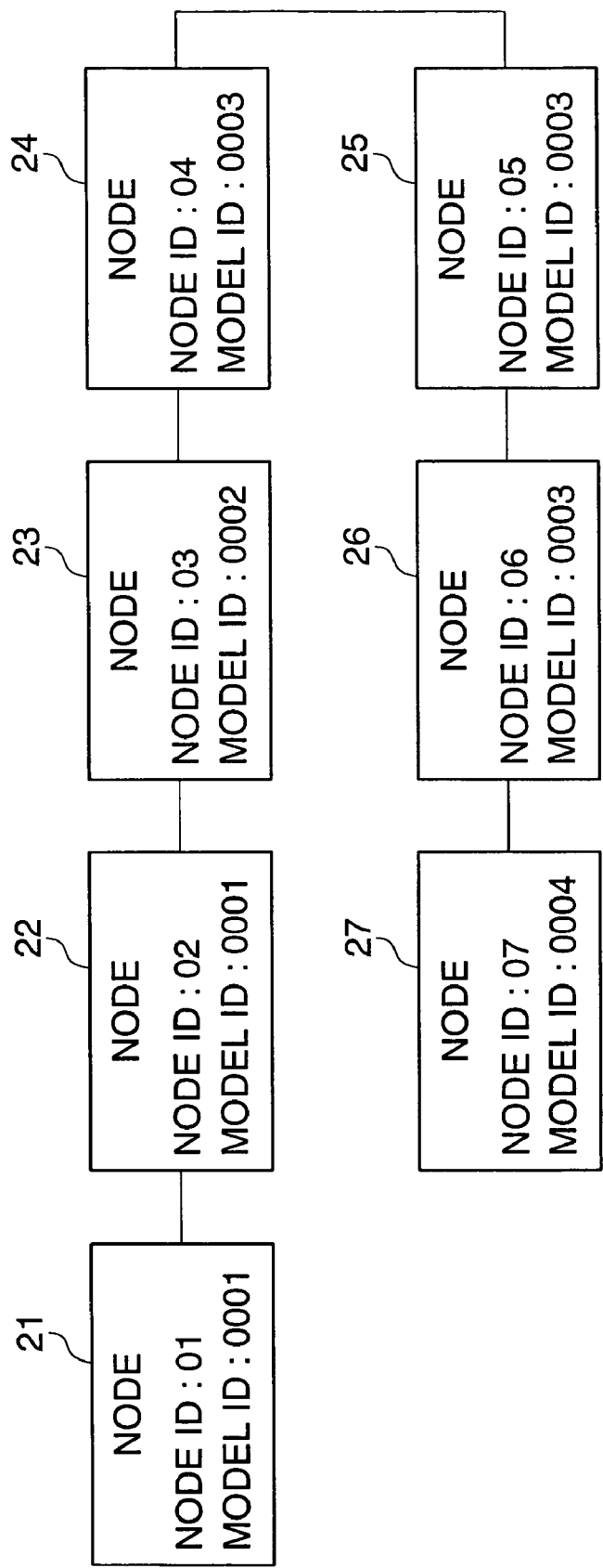
FIG. 2 is a block diagram showing an example of the configuration of a system formed by connecting a plurality of nodes including the communication path setup apparatus to each other.

FIG. 2 is a block diagram showing an example of the configuration of a system formed by physically connecting a plurality of nodes including the communication path setup apparatus to each other via communication cables or the like as communication lines.

As shown in FIG. 2, this system is formed by connecting seven nodes 21 to 27 in series by wire. Of course, the connection method is not limited to a wire connection, but it may be a wireless connection. Further, the connection mode is not limited to a serial connection, but it may be a parallel connection.

The nodes 21 to 27 have respective node IDs and model IDs assigned thereto. The node ID is an identifier uniquely assigned to each of the nodes belonging to the system, while the model ID is an identifier uniquely assigned to each of products (models). That is, within the system, there cannot exist nodes having the same node ID, but there can exist nodes having the same model ID. In the present embodiment, model IDs are not assigned to respective different models, but assigned to respective different types of apparatuses. This is only for clarity, and as described above in the definition thereof, the system may be configured to include nodes having model IDs assigned to respective different models of the same type of apparatus. The types of models include e.g. a PC (personal computer), a mixer, an electronic musical instrument, and I/O equipment, and in the present embodiment, a model ID 0001 is assigned to the electronic musical instrument, 0002 to the PC, 0003 to the mixer, and 0004 to the I/O equipment. The communication path setup apparatus according to the present embodiment is a PC, as described hereinbefore, and therefore, it corresponds to the node 23 having the node ID 0002.

The communication path setup apparatus according to the present embodiment periodically performs communications with the other nodes, to thereby obtain information on equipment attributes (hereinafter referred to as "the attribute information" and information on communication paths (hereinafter referred to as "the connection information") concerning each node, which are stored in the node, and store the respective pieces of information in an attribute information storage area and a connection information storage area, respectively, neither of which is shown. Further, the communication path setup apparatus according to the present embodiment is capable of freely setting up communication paths as desired, and further is configured such that other nodes can take over the configuration information (attribute information and connection information) on nodes disconnected from the system by disconnecting the communication line, as will be described in detail hereinafter. Moreover, if there is a change in the configuration information on any node when the setup of communication paths or taking over of the configuration information is performed, the corresponding contents stored in the attribute information storage area and the connection information storage area are rewritten, and the rewritten contents are transferred to the other nodes than the present node or the apparatus to thereby rewrite the attribute information and the connection information stored in the other nodes, so as to prevent occurrence of a discrepancy between the rewritten contents and the attribute information and the connection information stored in each of the other nodes.

FIG. 3 is a diagram showing a data format of a part of attribute information on nodes, which is stored in the attribute information storage area. Further, FIG. 4 is a diagram showing a data format of a part of connection information on nodes, which is stored in the connection information storage area.

The items of the attribute information shown in FIG. 3 are "node ID", "DISABLE", "GUIDE", "MIDI-IN", "MIDI-OUT", "AUDIO-IN", and "AUDIO-OUT". Of these items, the "node ID" and the "model ID" have already been described, and therefore the remaining items of the attribute information will be described now.

The item "DISABLE" represents a flag that assumes either a value of "0" or a value of "1". The value "0" indicates that the node is a component of the system (hereafter, such a node will be referred to as an "ABLE node"), and the value "1" indicates that the node was a component of the system, but it has been disconnected from the system (hereinafter, such a node will be referred to as a "DISABLE node").

The item "GUID" is an abbreviation of "Global Unique ID", which is an identifier uniquely assigned to each node. In other words, there are no plurality of objects having the same "GUID" in the world.

The item "MIDI-IN" represents the number of MIDI signals that can be input (the number of MIDI input terminals), while the item "MIDI-OUT" represents the number of MIDI signals that can be output (the number of MIDI output terminals). Similarly, the item "AUDIO-IN" represents the number of audio signals that can be input (the number of AUDIO input terminals), while the item "AUDIO-OUT" represents the number of audio signals that can be output (the number of AUDIO output terminals"). The number of signals indicated by the items "MIDI-IN", "MIDI-OUT", "AUDIO-IN", and "AUDIO-OUT" are set values, but not maximum values. In other words, the user can freely set the number of signals to each of these items insofar as it is within the limit of the maximum number of signals of the associated node. It should be noted that the terminals mentioned above are not physically provided in each node, but are logically realized on communication lines connecting between the nodes shown in FIG. 2.

As shown in FIG. 4, the connection information defines communication paths for signals transmitted between the nodes, and stores communication paths associated with all the input (IN) and output (OUT) terminals of all the nodes the attribute information on which is stored in the attribute information storage area. The connection information is classified into two types, one on the MIDI signals and the other on the audio signals. FIG. 4 shows the connection information on the MIDI signals out of the two types. The connection information on the audio signals can be formed in the same format as that of the connection information on the MIDI signals, and therefore the contents of the description of the connection information on the MIDI signals can also be applied as they are to a description of the connection information on the audio signals.

In FIG. 4, an item "communication source" represents an output side from which a MIDI signal is output, and an item "communication destination" represents an input side to which a MIDI signal is input. The communication source stores a MIDI signal output terminal of a node in a format defined as (node ID)(output terminal)(other information). Similarly, the communication destination stores a MIDI signal input terminal of a node in a format defined as (node ID)(input terminal)(other information). When a communication destination associated with a communication source stores a terminal of a node, it means that a communication path is established between a terminal of a node defined by the communication source and the terminal of the node defined by the communication destination. On the other hand, when a communication destination stores "none", it means that there is no communication path established for a communication source associated therewith.

The attribute information and the connection information defined by the formats described above are transmitted to the other nodes of the system in predetermined timing as described hereinbefore. A node having received the attribute information and the connection information stores parts of these two types of information which are associated with the node itself in an area of a built-in memory thereof allocated to the information (e.g. an area in a RAM allocated thereto), and performs a configuration change of itself based on the information. More specifically, when one or more communication paths associated with the node itself have been changed, the node changes the settings related to the communication path(s) (input terminal(s) and/or output terminal(s)) of its own, based on the changed communication path(s), and transmits MIDI signals and audio signals according to the changed communication path(s).

A control process executed by the communication path setup apparatus configured as described above will first be briefly outlined with reference to FIGS. 5A to 5D, and then described in detail with reference to FIG. 6.

FIGS. 5A to 5D are diagrams showing an example of changes in a screen displayed on the display device 7.

Figure 5A:
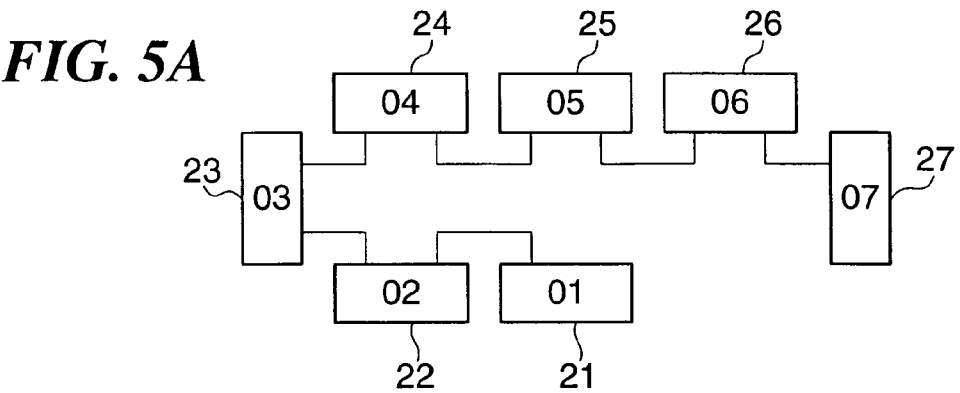
FIGS. 5A to 5D are diagrams showing an example of changes in a screen displayed on a display device appearing in FIG. 1.

When the user selects either a communication path for MIDI signals or a communication path for audio signals, and instructs the display of the selected type of communication path, the attribute information and connection information stored in the respective attribute and connection information storage areas are read out to display, on the display device 7, all nodes storing the associated pieces of the two types of information, in blocks, and the communication paths (of MIDI signals or audio signals) between the nodes. FIG. 5A is a diagram showing an example of the screen displayed when information on seven ABLE nodes 21 to 27 is stored. In FIG. 5A, each communication path between each pair of nodes displayed adjacent to each other is shown as a single line. This is only for clarity, because if the number of paths is increased or communication paths between pairs of nodes displayed as not being adjacent to each other are displayed, it is difficult to visually grasp the communication paths as a whole. Actually, the number of lines or cables that constitute a communication path between each pair of nodes displayed as being adjacent to each other is not limited to one, and communication paths are established between nodes displayed as not being adjacent to each other, depending on the case. Further, an output terminal and an input terminal of each node are each displayed together with a terminal number set thereto, and each pair of an output terminal and an input terminal for which a communication path is established are displayed as being connected by a line, so as to enable the user to grasp which output terminal of which node is connected to which input terminal of which node.

Figure 5B:
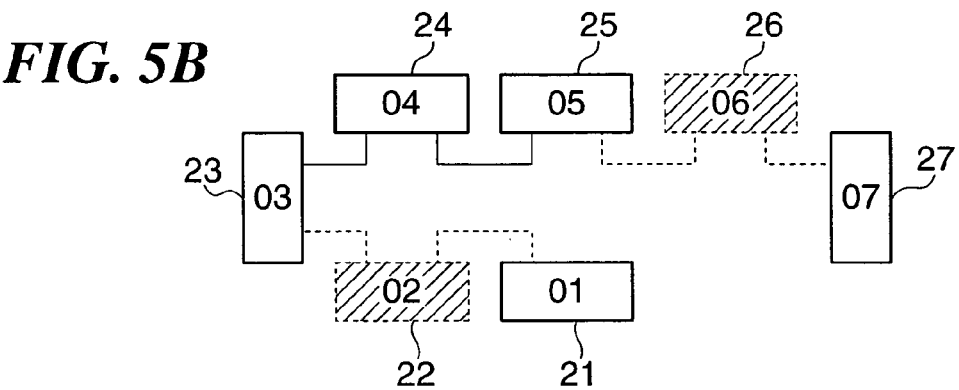

Assuming, in the state shown in FIG. 5A, that the user disconnects ABLE nodes 22 and 26 from the system (disconnects communication lines to cut off communications between the nodes 22 and 26 and the other nodes of the system), the "DISABLE" flags in the attribute information in the nodes 22 and 26 are rewritten into "1" whereby the nodes 22 and 26 are displayed as DISABLE nodes, as shown in FIG. 5B. In the present embodiment, the DISABLE nodes are grayed out (displayed in a gray-out mode). However, in the drawings appended hereto, it is difficult to illustrate nodes in the gray-out mode, and therefore, in FIG. 5B, the DISABLE nodes are hatched instead of being grayed out. One of the features of the present invention is that the communication path setup apparatus is configured such that, even when the ABLE nodes are changed into DISABLE nodes, configuration information (attribute information and connection information) on the ABLE nodes before the change is stored in a prior-to-change information storage area, not shown, which is allocated to a predetermined area in the RAM 5.

Figure 5C:
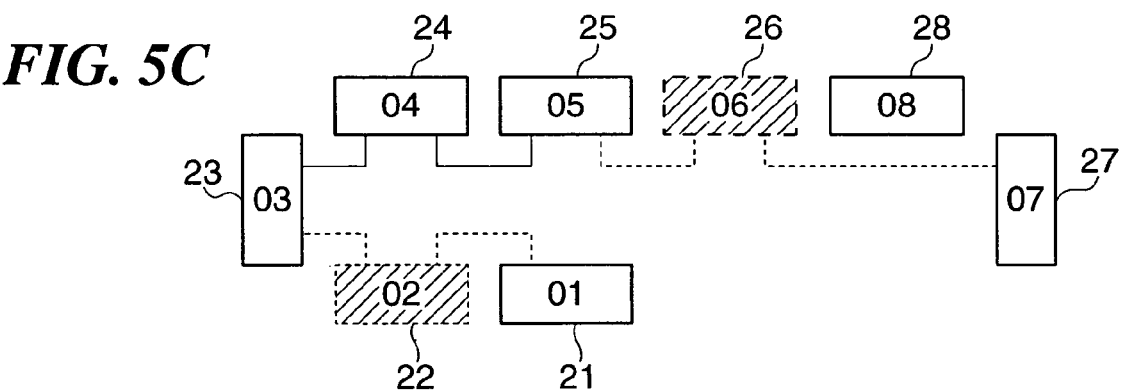

When an ABLE node is newly added to the system in the state shown in FIG. 5B (settings are carried out for a new node such that communications to and from the new node are possible via communication lines therefor, and the attribute information and the connection information on the new node are obtained from the new node and added to the attribute information storage area and the connection information storage area), the added ABLE node 28 is additionally displayed as shown in FIG. 5C. At this time, the "DISABLE" flag of the added node is set to "0". When the user performs a clicking operation or dragging operation on the ABLE node 28 additionally displayed, a DISABLE node from which configuration information can be taken over by the ABLE node 28 is searched for, and as shown in FIG. 5C, the DISABLE node 26 found by the search is displayed in a special mode different from the gray-out mode, e.g. in a mode flashing contour lines of the block in a predetermined color. This enables the user to intuitively notice that the configuration information set to the DISABLE node 26 can be taken over by the new ABLE node 28.

Figure 5D:
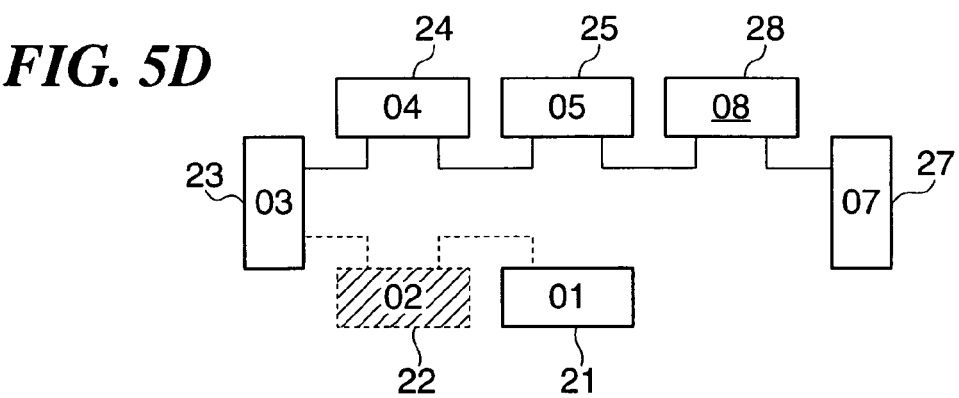

Then, in the state shown in FIG. 5C, when the user performs a dragging operation on the ABLE node 28 to move the ABLE node 28 to the location of the ABLE node 26 and then performs a dropping operation, the DISABLE node 26 disappears from the system and the ABLE node 28 is displayed at the location where the DISABLE node 26 was displayed, in the ABLE mode, as shown in FIG. 5D. At this time, the configuration information having been set to the DISABLE node 26 is taken over as it is by the ABLE node 28, to be set thereto.

Next, a detailed description will be given of the control process briefly described above.

Figure 6:
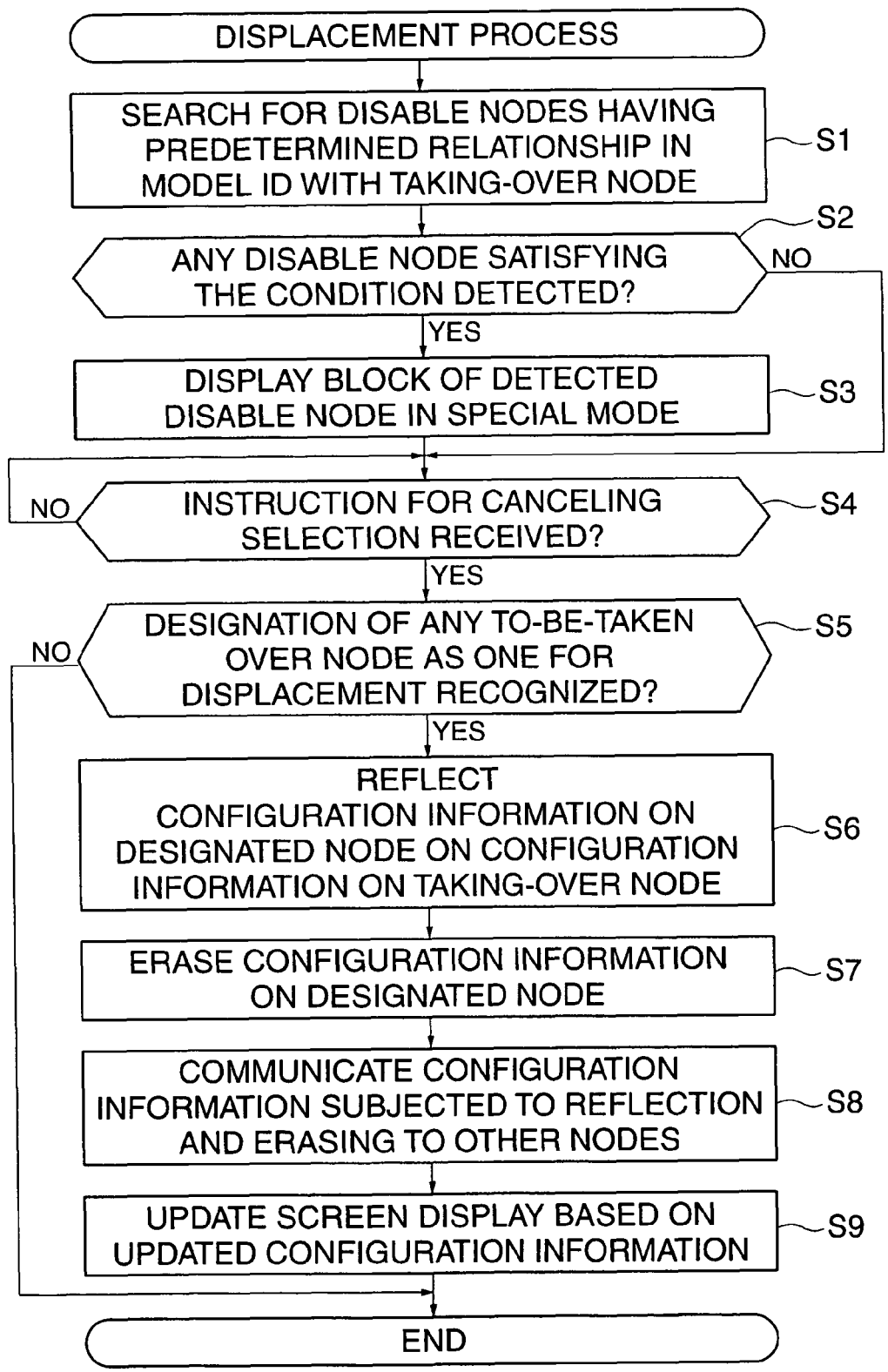
FIG. 6 is a flowchart showing a displacement process executed by the communication path setup apparatus, particularly a CPU thereof, appearing in FIG. 1.

FIG. 6 is a flowchart showing a displacement process executed by the communication path setup apparatus according to the present embodiment, particularly the CPU 3 thereof, and the displacement process corresponds to the process of operations described hereinabove with reference to FIGS. 5C and 5D.

This displacement process is started when a node on which the user has performed a clicking operation or a dragging operation, i.e. a selected node satisfies predetermined conditions, and therefore, before describing the present displacement process, a description will be given of the conditions to be satisfied by the selected node.

In the present embodiment, the selected node needs to satisfy the conditions that it is an ABLE node, and at the same time that it is an unconnected node (not connected to any other node, that is, the selected node has no communication path set in the connection information thereon). To determine whether the selected node satisfies the conditions, it is only required to read out pieces of the configuration information stored in the attribute information storage area and the connection information storage area, which pieces are associated with the selected node, and perform the determination based on the read pieces of the configuration information. If these conditions are satisfied as a result of the determination, the process proceeds to the present displacement process.

In the present displacement process, first, a DISABLE node (to-be-taken over node) which has a predetermined relationship in model ID with the selected node (taking-over node) is searched for (step S1). The processing in the step S1 is performed more specifically by:

(1) reading out a model ID from the attribute information on the taking-over node;

(2) comparing the read model ID with the model IDs of all DISABLE nodes; and (3) searching for a DISABLE node having a predetermined relationship with (e.g. being identical to) the read model ID.

Then, as a result of the search in the step S1, if DISABLE modes satisfying the conditions are detected, all the detected DISABLE nodes are determined as to-be-taken over nodes, and as shown in FIG. 5C, the contour lines of each of the respective display blocks of the determined DISABLE nodes are displayed in the aforementioned special display mode such that the determined DISABLE nodes are distinguishable from the undetermined DISABLE nodes (steps S2 to S3).

Then, until an instruction for canceling the selection is received, i.e. a dropping operation after the dragging operation is performed, the process is placed in a wait state (step S4), and when the dropping operation has been performed, a position where the dropping operation is performed, i.e. a position where the block of the taking-over node is displayed is detected, and it is determined whether or not the detected display position overlaps the display position of the block of any of the to-be-taken over nodes. If there is an overlap, it is judged that the to-be-taken over node is designated as one for the displacement, and set to a designated node (steps S5→S6).

Next, the configuration information, i.e. the attribute information and the connection information on the designated node is read out to write the attribute information except a part thereof over the attribute information on the taking-over node, and the connection information over the connection information on the same. In the present embodiment, the part of the attribute information includes a node ID, a DISABLE flag, a GUID, and a model ID (i.e. data contents of which cannot be changed through configuration by user's manual input), and these items of the data of the taking-over node remain unchanged. Thus, the configuration information on the designated node is reflected on that of the taking-over node (step S6).

Next, the configuration information, i.e. the attribute information and the connection information on the designated node is completely erased from the attribute information storage area and the connection information storage area (step S7), and the configuration information for which the reflecting and deleting operations have thus been executed is transmitted to the other nodes connected to the present node, i.e. the communication path setup apparatus via the communication lines, thereby causing each of the other nodes to change the attribute information and the connection information stored in the node and change the communication paths for the node associated therewith (step S8). Then, in the communication path setup apparatus according to the present embodiment, the screen display is updated based on the new configuration information (step S9), followed by terminating the present displacement process.

As described above, according to the present embodiment, it is possible to cause the configuration information on each of disconnected nodes to be taken over by a selected one of other nodes by the simple operations of selecting a to-be-taken over node and a taking-over node. Further, nodes which can be set to to-be-taken over nodes are displayed in the special mode, which enables the user to promptly grasp which nodes are to-be-taken over nodes.

Although in the present embodiment, a taking-over node is dragged and dropped onto a to-be-taken over node, this is not limitative, but inversely, the to-be-taken over node may be dragged and dropped onto the taking-over node. That is, any designation method may be employed insofar as it can perform the designation in a manner clearly showing the configuration information on which node should be reflected on the configuration information on which node.

Further, it may be arranged such that when a new ABLE node is added to the system, without any operation (e.g. drag & drop operation) by the user, a DISABLE node from which the configuration information can be taken over is searched for, and the configuration information on the DISABLE node found by the search is automatically taken over by the new ABLE node. In this case, in place of the steps S2 to S5 in FIG. 6, a step S2' is added in which when a plurality of DISABLE nodes are found by the search in the step S1, one of the found DISABLE nodes determined according to a predetermined order of priorities is set to a designated node, whereas when a single DISABLE node is found by the search in the step S1, the found DISABLE node is set to the designated node. By executing the steps S1, S2', and S6 to S9, the displacement process can also be realized.

Although in the present embodiment, only DISABLE nodes which have the same model ID as that of the taking-over node are selected as to-be-taken over nodes, this is not limitative, but any nodes may be selected as to-be-taken over nodes insofar as they satisfy the predetermined condition of the taking-over node being capable of taking over the configuration information thereon (have a predetermined relationship with the taking-over node). The nodes satisfying the condition are not limited to DISABLE nodes having the same model ID as that of the taking-over node, but it is also possible to define a plurality of models (model IDs) from which a taking-over node can take over the configuration information thereon, and search for the DISABLE nodes having any of the defined model IDs as nodes which can be to-be-taken over nodes to present the same as such.

Further, although in the present embodiment, the gray-out mode is employed in displaying DISABLE nodes, this is not limitative, but it is to be understood that any mode of display, including modes using any suitable pattern and/or any suitable color, may be employed insofar as it can present the DISABLE nodes in a manner distinguishable from the ABLE nodes. Similarly, for the special mode, any mode may be employed insofar as it makes the DISABLE nodes found by the search distinguishable from the other DISABLE nodes.

Further, an ABLE node to be selected (ABLE node on which a drag & drop operation is performed) is not limited to an unconnected node, but it may be a connected ABLE node. In such a case, the connections set for the selected ABLE node before selection are all erased, and overwritten by the connections of the designated node.

Next, a description will be given of a communication path setup apparatus according to a second embodiment of the present invention.

Figure 7:
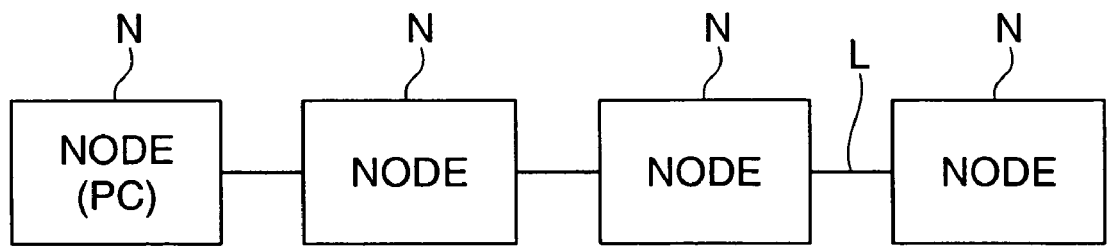
FIG. 7 is a block diagram showing a music system configuration to which a communication path setup apparatus according to a second embodiment of the present invention is applied.

FIG. 7 is a block diagram showing a music system configuration to which the communication path setup apparatus according to the second embodiment is applied. The illustrated music system configuration is physically constructed by connecting a plurality of various pieces of equipment (nodes) using communication cables conforming to the IEEE1394 standard, over a network.

In FIG. 7, four physically existing nodes N equipped with at least an IEEE1394 port are connected over the network in series (chain connection) through physical connections using IEEE1394 cables L. The nodes connected over the network may be any desired piece of control equipment and music equipment, such as a personal computer (PC), an electronic musical instrument, such as a music synthesizer, an automatic performance apparatus, such as a sequencer, a waveform recorder, a signal processor, such as a mixer and an effector, and a tone generator. The manner of connection of nodes over the network is not limited to a chain connection as shown in FIG. 7, but it may be a multi-point connection connecting the nodes via a network hub or the like. Further, the connection method is not limited to a wire connection, but it may be a wireless connection.

Installed on one of the nodes N, which is implemented by a personal computer, is a predetermined program (patchbay program), not shown, and by executing the patchbay program, it is possible to set communication paths of music data between nodes N connected via IEEE1394 ports, for a plurality of channels of music data which are handled by the nodes (communicated via the IEEE1394 ports), i.e. to define from which channel of which node music data should be transmitted to which channel of which node (logical connections of channels between the nodes), whereby music data, such as audio signals and MIDI signals, can be transmitted and received in real time via the logical connections even between nodes N on the network which are not directly connected via music data cables. Each node stores the attribute information and the connection information (not shown) of its own, and MIDI signals and audio signals generated or processed by each node are transmitted to the other nodes via the cables as the physical connections connected to the IEEE1394 ports according to the logical connections set up by the patchbay program.

Figure 8:
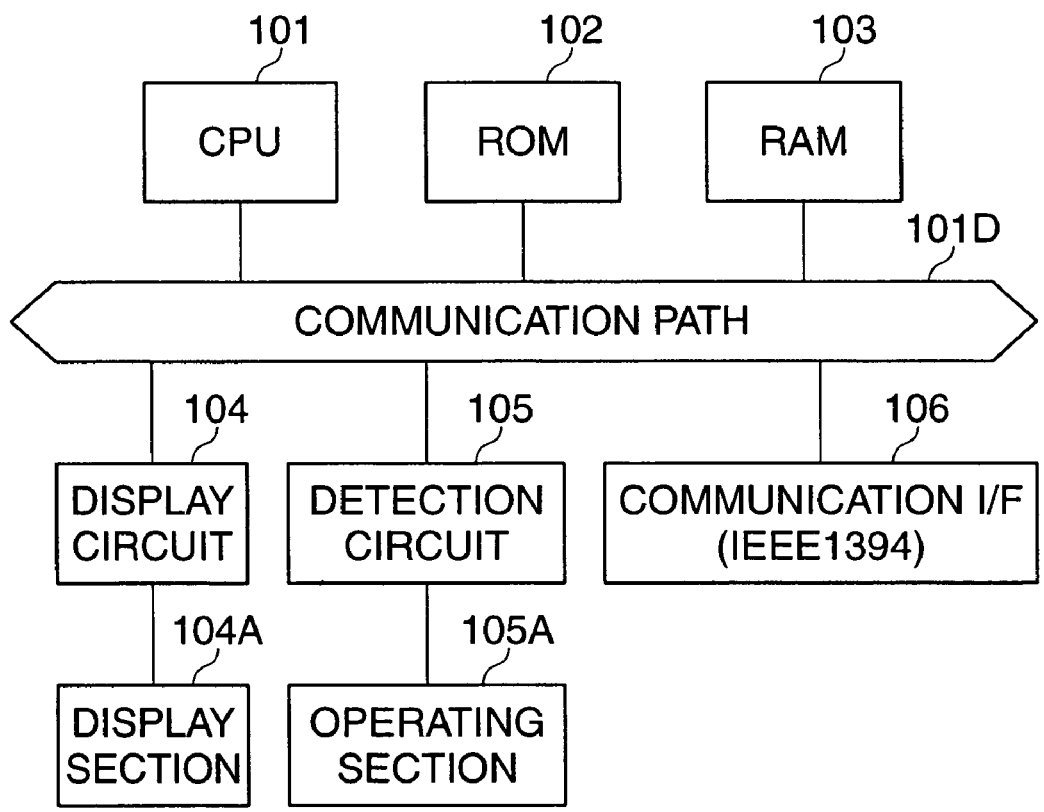
FIG. 8 is a block diagram showing the arrangement of the communication path setup apparatus according to the second embodiment.

FIG. 8 is a block diagram showing the arrangement of the communication path setup apparatus according to the second embodiment. The illustrated example of the hardware configuration of the communication path setup apparatus is implemented by a personal computer, and a process (read file-based connection setup process) for setting up music data communication paths by logical connections based on a setup data file (see FIG. 11, referred to hereinafter) is executed by the computer according to predetermined software (patchbay program) based on which the computer realizes the process.

Although a detailed description will be given hereinafter (see FIGS. 13A and 13B, referred to hereinafter), in the read file-based connection setup process, an imaginary music system configuration and an actual music system configuration included in a logical music system configuration are displayed on a screen in a manner visually distinguishable from each other, whereby it is possible for the user to update the logical music system through recognition of (discrimination between) the two types of music system configurations. It is to be understood that the read file-based connection setup process can be executed not only by computer software, but also by a microprogram based on which a DSP (Digital Signal Processor) performs processing operations. Further, the read file-based connection setup process is not limitatively executed by software, but may be executed by a dedicated hardware apparatus comprised of a discrete circuit or an integrated circuit or a large-scale integrated circuit.

The communication path setup apparatus according to the present embodiment is controlled by a microcomputer which is comprised of a microprocessor unit (CPU) 101, a read-only memory (ROM) 102, and a random access memory (RAM) 103. The CPU 101 controls the overall operation of the communication path setup apparatus. Connected to the CPU 101 via a communication bus 1D (e.g. data and address bus) are the ROM 102, the RAM 103, a display circuit 104, a detecting circuit 105, and a communication interface (I/F) 106. The ROM 102 stores various control programs executed by the CPU 101, and various data and the like referred to by the CPU 101. The RAM 103 is used as a work memory for temporary storing various data generated when the CPU 101 executes programs including the predetermined program, a current buffer for temporarily storing a program being currently executed and data associated therewith, and so forth. In the present embodiment, the RAM 103 stores a plurality of setup data files. Each setup data file stores attribute information and connection information on all nodes constituting one logical music system as information on the configuration of the logical music system (see FIG. 11). Beside the setup data files, the RAM 103 stores attribute information and connection information on a plurality of nodes (see FIGS. 9 and 10, referred to hereinafter) in the current buffer thereof, as information to be displayed on a screen in accordance with the start of the read file-based connection setup process (see FIGS. 13A and 13B). Further, in an area separate from the current buffer and areas for the setup data files, there are stored attribute information and connection information on the present communication path setup apparatus as one node of the music system.

Now, a description will be given of the attribute information and the connection information stored in the current buffer of the RAM 103. FIG. 9 is a diagram showing a data format of the attribute information, and FIG. 10 is a diagram showing a data format of the connection information. The attribute information and connection information stored in the current buffer includes not only information on actual nodes existing in the music system which are currently physically connected to the music system, but also information on imaginary nodes which are not physically connected to the music system and therefore not existing in the music system. In other words, the current buffer stores information on a logical music system configuration.

The attribute information stores data concerning attributes (information on a basic configuration status other than connections, such as an identifier and performance) of each of a plurality of nodes (all nodes to be displayed as respective blocks on a music system configuration screen (see FIG. 12), referred to hereinafter). The nodes referred to in the attribute information are not necessarily actual nodes physically connected to the music system, but may include imaginary nodes which are not physically connected to the music system. As can be seen from FIG. 9, the attribute information on a node includes the items of "GUID" (Global Unique Identifier), "model ID", "DISABLE", "MIDI-IN", "MIDI-OUT", and "Others", not shown, other than these items. The item "GUID" represents an identifier (e.g. a production number recorded in a product from the outset, which is unique to the product) unique to each piece of equipment corresponding to the node, and the nodes have respective different GUIDs assigned thereto such that there are no nodes having the same GUID. The item "model ID" represents an identifier unique to each model of a product, a machine type or the like, and the same model ID is assigned to nodes having the same product name or machine type. The item "DISABLE" represents a flag that indicates whether the node should be displayed in a DISABLE mode as an imaginary node not physically connected to the music system (e.g. when set to a value of 1) or in an ABLE mode as an actual node physically connected to the music system (e.g. when set to a value of 0). The user cannot change the pieces of information of the items "GUID", "model ID", and "DISABLE" as desired, but the pieces of information can be changed only by importing them from a read setup data file or from each actual node. The item "MIDI-IN" represents the number of input logical terminals corresponding to the number of input channels at which the node can receive MIDI signals, and an appropriate number set by the user is stored as MIDI-IN. The item "MIDI-OUT" represents the number of output logical terminals corresponding to the number of output channels from which the node can output MIDI signals, and an appropriate number set by the user is stored as MIDI-OUT. The item "Others", not shown, storing data such as an item "AUDIO-IN" that represents the number of input logical terminals of audio signals and an item "AUDIO-OUT" that represents the number of logical output terminals of the same in a similar manner to the item "MIDI-IN" and the item "MIDI-OUT" as described above.

On the other hand, the connection information stores communication paths for signals between the nodes (connections between logical terminals of different nodes), and more specifically, connections of all logical terminals on which the attribute information is stored in the current buffer (channels for communicating music data). As can be seen from FIG. 10, the connection information is largely divided into two types of information, one on communication sources ("from" column) from which respective pieces of music data are to be output and the other on communication destinations ("to" column) to which respective pieces of music data are to be input, and in the communication sources ("from" column) and communication destinations ("to" column), GUIDs and logical terminals of nodes are defined. In the communication sources ("from" column), all logical output terminals of the nodes constituting the music system are defined, and in the communication destinations ("to" column), logical input terminals of nodes to which selected ones, if any, of the logical output terminals are to be connected are defined (or may not be defined) as required. Based on the connection information, the connections in the logical music system configuration are displayed on the screen. That is, in the illustrated example, a music system configuration is displayed with connections set up for communication paths for MIDI signals, such that a logical output terminal (MIDI-OUT1) of a node having a GUID of 0001 is connected to a logical input terminal (MIDI-IN1) of a node having a GUID of 0002; a logical output terminal (MIDI-OUT2) of the node having the GUID of 0001 is connected to a logical input terminal (MIDI-IN2) of the node having the GUID of 0002; a logical output terminal (MIDI-OUT1) of the node having the GUID of 0002 is connected to a logical input terminal (MIDI-IN1) of a node having a GUID of 0003; and a logical output terminal (MIDI-OUT16) of a node having a GUID of 0004 is not connected to any of logical input terminals of any node.

In addition to OUT connection information described above in which all logical output terminals of the nodes constituting the music system are defined, and communication destinations are respectively assigned to selected ones of the defined logical output terminals, there is stored the other type of connection information, i.e. IN connection information, not shown, in which all logical input terminals of the nodes constituting the music system are defined as communication destinations ("to" column), and logical output terminals of the nodes are respectively assigned as communication sources ("from" column) to selected ones of the defined logical input terminals. However, the IN connection information is not used in displaying the logical music system configuration.

The connection information described above stores not only the communication paths for MIDI signals, but also communication paths, not shown, for audio signal, in the same storing method.

Figure 11:
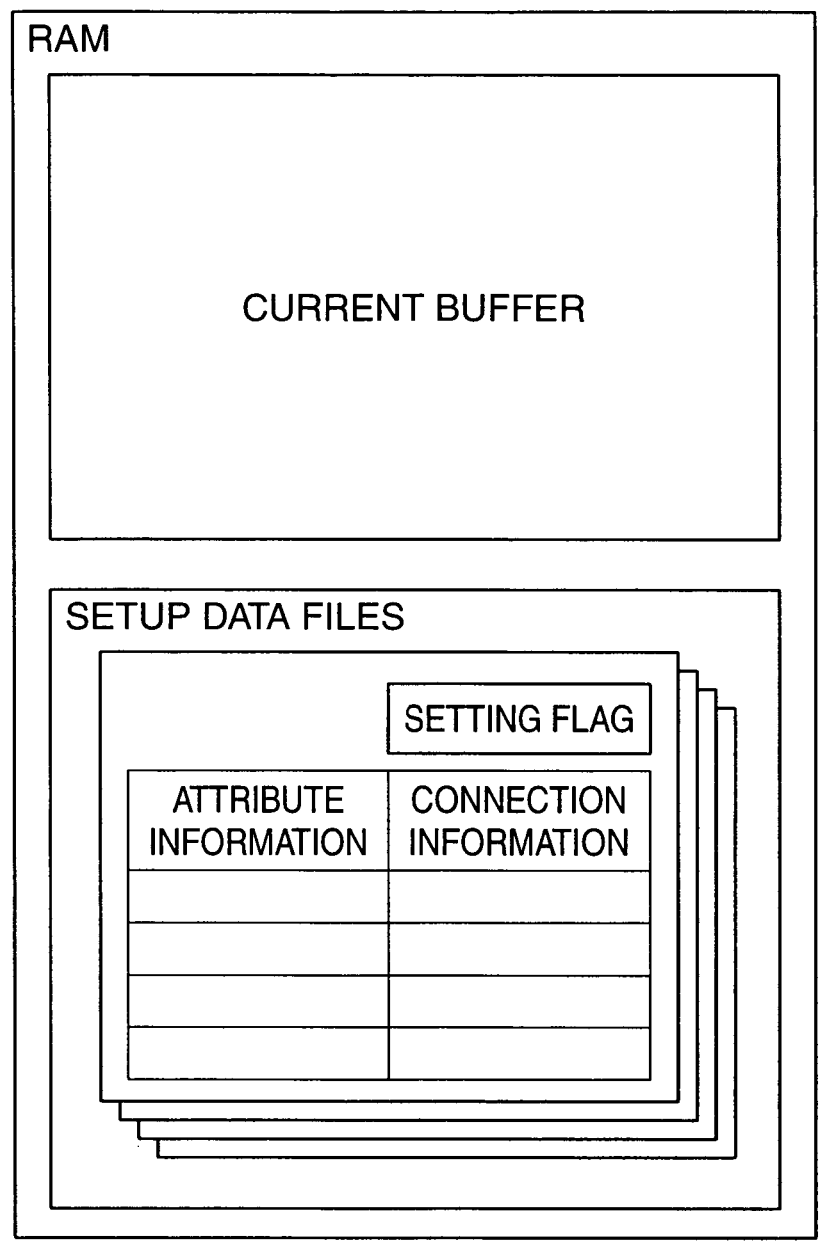
FIG. 11 is a diagram showing contents of a RAM, which is useful in explaining a current buffer and a data format of setup data files.

Next, a brief description will be given of the setup data file. FIG. 11 is a diagram showing a data format of the setup data file. As can be seen from FIG. 11, lots of setup data files are stored for respective music system configurations in a different area in the RAM 103 than the current buffer that stores the attribute information and the connection information as information to be displayed on the screen upon the start of the aforementioned read file-based connection setup process (see FIGS. 13A and 13B). Each setup data file stores attribute information and connection information on all nodes constituting one logical music system. Further, the setup data file stores a configuration flag as information with reference to which the CPU 101 automatically determines which of a fully file-based setup process or a file-as-template setup process is to be executed when the user does not directly designate, in execution of the read file-based connection setup process, which of the two processes should be executed.

Referring again to FIG. 8, the display circuit 104 displays various screens, such as a music system configuration screen (see FIG. 12) and a control state of the CPU 101, on the display section 104A implemented by a liquid crystal panel (LCD) or a CRT. By viewing the music system configuration screen, the user can properly set up communication paths for music data while visually recognizing an imaginary music system configuration and an actual music system configuration. An operating section (switches, etc.) 105A is comprised of various operating elements for designating a setup data file to be read or changing communication paths for music data displayed on the screen. The detecting circuit 105 detects an operative state of the operating section 105A. The communication interface (I/F) 106 provides the present apparatus with a music LAN interface conforming to IEEE1394 standard (mLAN as a music data communication standard proposed by the present assignee). The communication interface (I/F) 106 is comprised of an IEEE1394 standard interface as a lower layer, and a music LAN driver for controlling music data communications in accordance with the mLAN standard (mLAN communication program) as an upper layer. The music LAN driver realizes transfer of music data based on logical connections, according to the attribute information and the connection information on the nodes stored in the RAM 103 thereof. The IEEE1394 standard interface provides interface formed by hardware and software which perform data communications in conformity to the IEEE1394 standard, and actually performs operations for transmitting and receiving music data via communication cables connecting the nodes.

Figure 12:
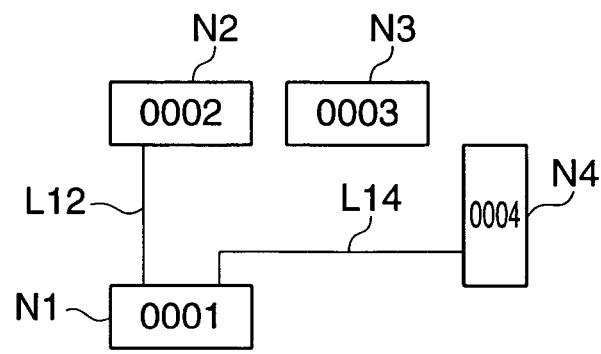
FIG. 12 is a diagram showing an example of a music system configuration screen displaying a logical music system configuration.

In the communication path setup apparatus according to the present embodiment, logical connections between the nodes and the like are displayed as the music system configuration screen on the display section 104A, and by viewing this screen, it is possible for the user to update the logical music system while visually comparing the imaginary music system configuration and the actual music system configuration. An example of the display of the music system configuration screen is shown in FIG. 12. That is, FIG. 12 is a diagram showing an example of the music system configuration screen displaying a logical music system configuration. The music system configuration screen displays a logical music system configuration including all connections of nodes irrespective of whether the nodes are actually existing or not, based on the attribute information and the connection information stored in the current buffer.

The music system configuration screen is a connection status display screen displaying node blocks and connections. Based on the attribute information and the connection information stored in the current buffer, this screen displays the nodes in node blocks (N1 to N4) (node block display) and the connections in lines (L12 and L14) (line display). In the music system configuration screen, the existing or actual nodes are displayed in node blocks in the ABLE mode (e.g. in white enclosed by solid lines), and the non-existing or imaginary nodes in node blocks in the DISABLE mode (e.g. in gray enclosed by broken lines). The line display is a connection display which shows logical terminal connections between the nodes. In the example shown in FIG. 12, two nodes (N2 and N4) are connected to a node (N1) having a GUID of 0001. In this case, more specifically, e.g. a logical output terminal (MIDI-OUT1) of the node (N1) is connected to a logical input terminal (MIDI-IN1) of the node (N2) having a GUID of 0002 via the line L12, and a logical output terminal (MIDI-OUT2) of the node (N1) is connected to a logical input terminal (MIDI-IN2) of the node (N4) via the line L14. Further, although the node (N3) having a GUID of 0003 is an existing or actual node, it is an isolated node not connected to any other node (N1, N2, or N4).

The music system configuration screen displayed on the display section 104A includes two types: one showing a music system configuration with only connections for transmitting and receiving MIDI signals as described above, and the other showing a music system configuration with only connections for transmitting and receiving audio signals. One of the two types of screens can be selected for display. In the former type showing the connections for MIDI signals, only nodes having logical terminals (MIDI-IN/OUT) for MIDI signals are displayed to show a music system configuration, while in the latter type showing the connections for audio signals, only nodes having logical terminals (AUDIO-IN/OUT) for audio signals are displayed to show a music system configuration.

In the illustrated music system configuration screen, only one line is displayed to indicate a connection between nodes for clarity. Actually, however, there are displayed connection lines in number corresponding to the number of connected pairs of logical terminals between the nodes.

The initial display of the music system configuration screen described above is executed in accordance with the start of the patchbay program, not shown. Now, a brief description will be given of the operation of the patchbay program.

When the patchbay program is started, an update is automatically instructed to acquire attribute information and connection information from each of all connected nodes (existing or actual nodes), and the acquired pieces of the attribute information and the connection information are written into an empty current buffer. In this case, the pieces of the attribute information and the connection information stored in the current buffer are only on the nodes that are currently physically connected to the music system, i.e. actually existing on the music system. Therefore, in the attribute information stored in the current buffer, all the DISABLE flags are set to "0", so that in the music system configuration screen initially displayed based on the attribute information and the connection information stored in the current buffer, all nodes and connections are displayed in the ABLE mode as shown in FIG. 12, by way of example.

The patchbay program periodically issues an update instruction, to acquire attribute information and connection information on physically connected, i.e. existing nodes at the time point of issue of the update instruction. After the update, if there is any node which was connected at the time point of the initial display but already disconnected when a new update instruction has been issued, the DISABLE flag for the disconnected node in the attribute information stored in the current buffer is set to "1", and the node is also displayed in the DISABLE mode in the music system configuration screen.

Further, the patchbay program changes the logical music system configuration (e.g. connections thereof) as required in response to a predetermined user operation performed on the music system configuration screen. For example, when the user moves a cursor or the like to a desired logical output terminal and a desired logical input terminal displayed on the screen to perform clicking operations thereon, a communication path defined by the logical output terminal as a communication source and the logical input terminal as a communication destination on which the clicking operations have been performed is written into the current buffer. Then, the logical output terminal and logical input terminal are displayed in a state connected by a line.

Further, in the patchbay program, besides the process described above, the read file-based connection setup process (described hereinafter with reference to FIGS. 13A and 13B) is executed in response to any of predetermined user operations described below. Although described in detail hereinafter, the read file-based connection setup process is configured such that logical connections between nodes are automatically set up based on a read setup data file. In doing this, to enable the user to discriminate between the imaginary music system configuration and the actual music system configuration, the music system configuration screen is automatically updated.

The read file-based connection setup process is started, for example, when the user selects a desired one of the setup data files to be read after selecting the "Open" button on the menu screen, not shown, (the process executed in response to this user operation will be referred to as "fully file-based setup process"), or when an "Open template" button is selected on the menu screen to select a setup data file to be read (the process executed in response to this user operation will be referred to as the file-as-template setup process), That is, when a setup method (hereinafter also referred to as "whether the fully file-based setup process or the file-as-template setup process is to be executed") is specifically designated, or when a setup data file is selected and operated without specifically designating the setup method as described above, for example, as when a double-click operation is performed on one of the setup data files displayed in a list, or when a drag-and-drop operation is performed on a setup data file displayed as an icon by moving the setup data file to a predetermined position on the music system configuration screen while holding the icon with a click, or when a like user operation is performed (i.e. detected).

As described above, the patchbay program including the read file-based connection setup process as one function thereof configures the logical music system in response to the user operation on the music system configuration screen.

Figure 13A:
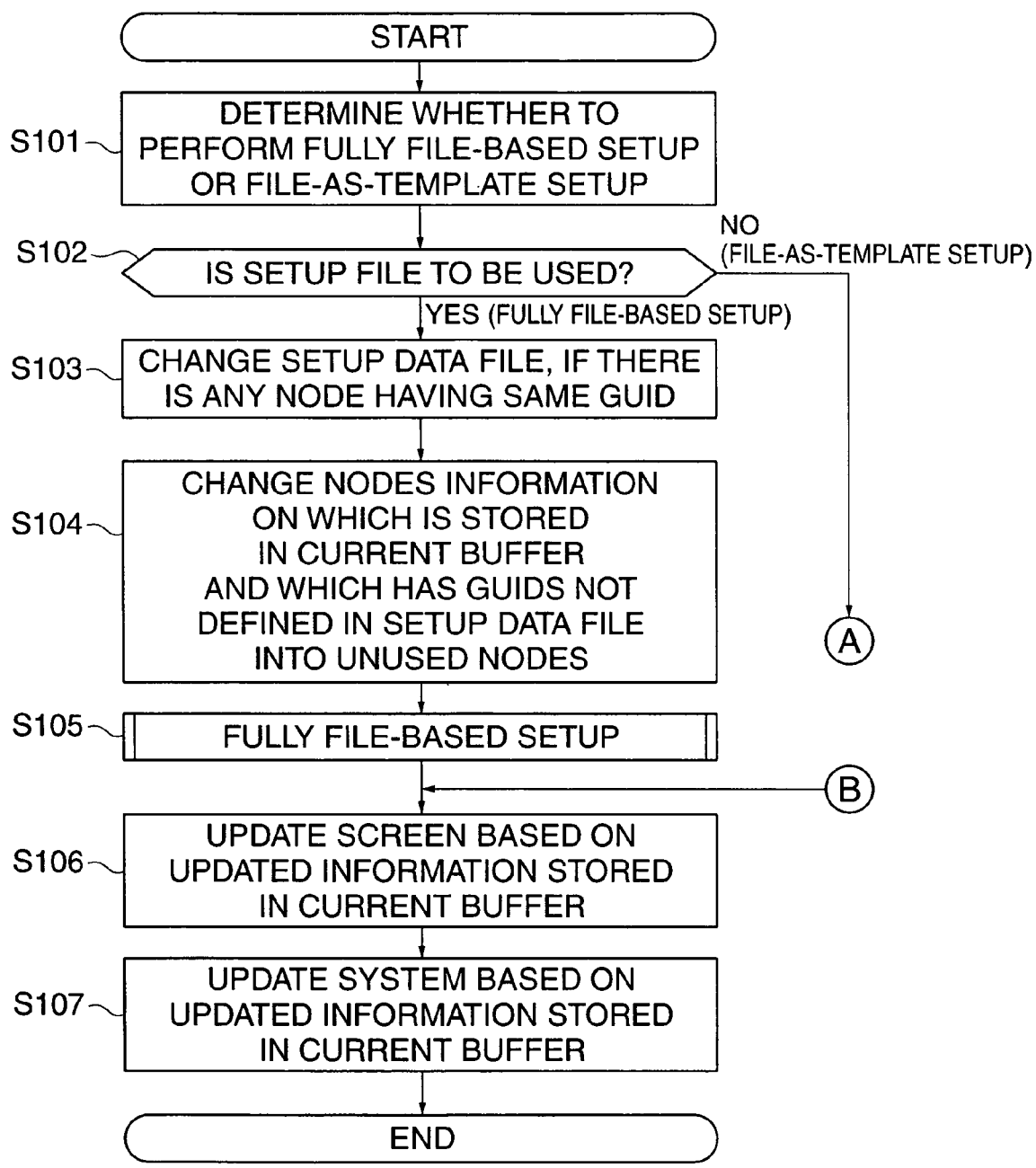
FIGS. 13A and 13B are flowchart showing an example of a connection setup process performed by reading a setup data file.
Figure 13B:
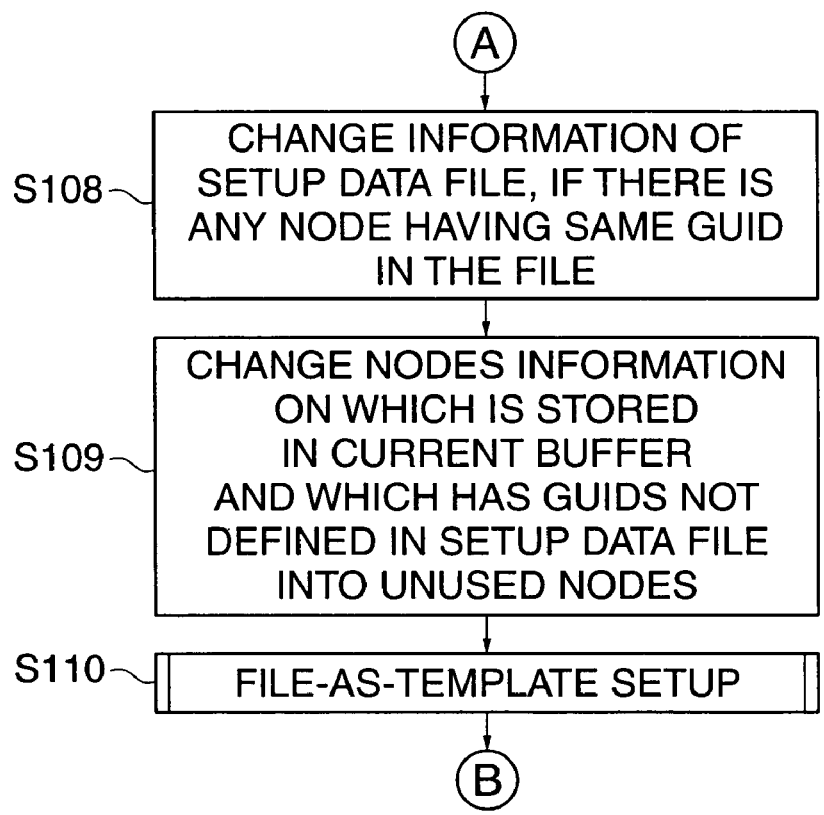
Figure 14:
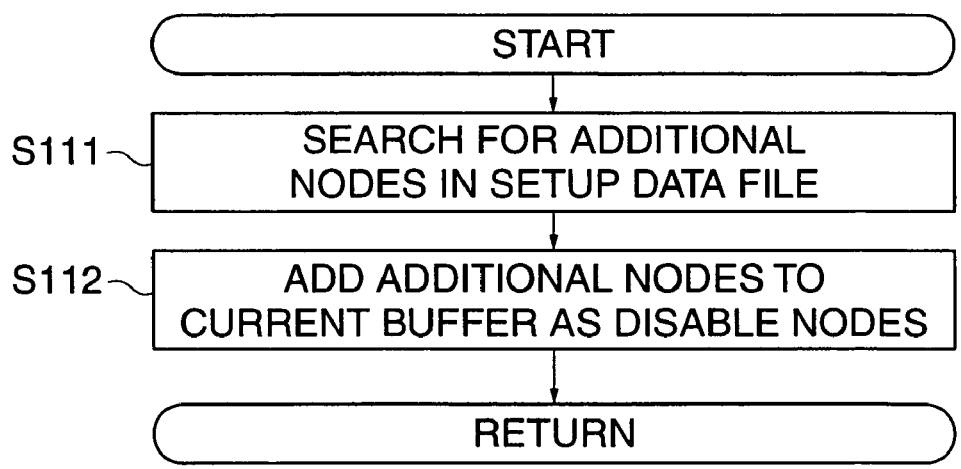
FIG. 14 is a flowchart showing an example of a fully file-based setup process.
Figure 15:
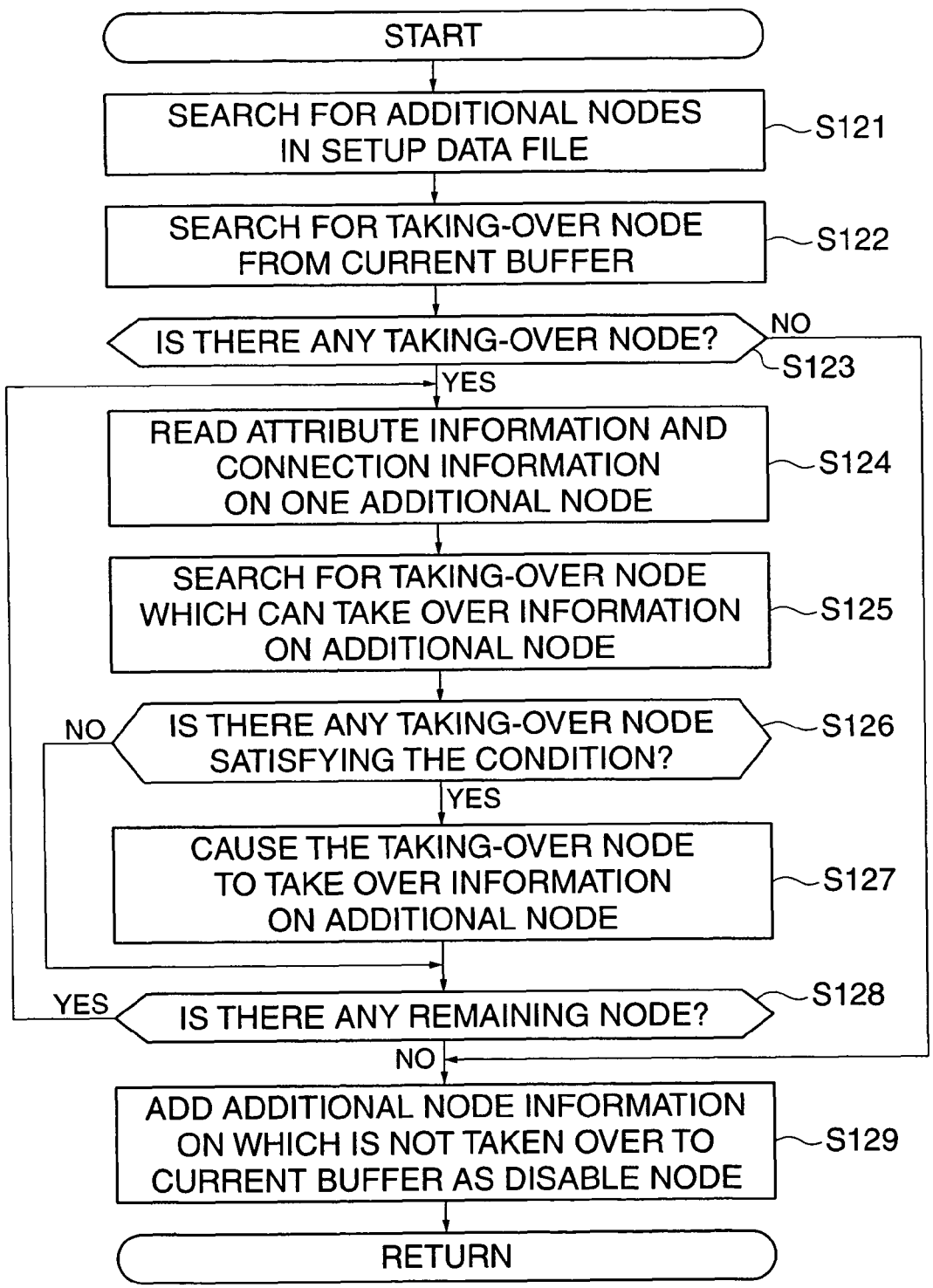
FIG. 15 is a flowchart showing an example of a file-as-template setup process.

Now, the read file-based connection setup process which is started in response to any of the above-described predetermined user operations will be described with reference to FIGS. 13A to 16D. FIGS. 13A and 13B are flowchart showing an example of the read file-based connection setup process. FIG. 14 is a flowchart showing an example of the fully file-based setup process; FIG. 15 is a flowchart showing an example of the file-as-template setup process; and FIGS. 16A to 16D are diagrams showing an example of the music system configuration screen displayed in response to execution of a screen update process (described hereinafter with reference to a step S106) in the read file-based connection setup process; more specifically, FIGS. 16A and 16B are diagrams showing screens displayed when the fully file-based setup process and the file-as-template setup process are performed, respectively; FIG. 16C is a diagram showing an initial screen displayed before a setup data file is read; and FIG. 16D is a diagram showing contents of the setup data file. However, in the illustrated example, it is assumed that the music system configuration is identical to one as described hereinbefore with reference to FIG. 12, and therefore the initial screen, as shown in FIG. 16C, is displayed before a setup data file is read. In this state, the fully file-based setup process or the file-as-template setup process is executed by newly reading the setup data file having the contents as shown in FIG. 16D (the contents are shown here using node blocks and lines, in the same manner as the music system configuration diagram, but they are not actually displayed on the screen). Now, a description will be given of the operations executed in the read file-based connection setup process with reference to FIGS. 16A to 16D.

As shown in FIGS. 13A and 13B, in the read file-based connection setup process, first, based on the setup data file which has been selected or designated for reading (set to the setup data file to be read), it is determined whether the fully file-based setup is to be executed or the file-as-template setup is to be executed (step S101). That is, depending on the executed one of the user operations described above, it is determined which is to be executed, the update of the music system configuration by the fully file-based setup or the update of the music system configuration by the file-as-template setup. If the setup data file is simply designated for reading without performing one of the specific designating operations described above, it is automatically determined, with reference to information (configuration flag) indicative of whether the fully file-based setup or the file-as-template setup is to be executed, which process is to be executed (step S102). When it is determined that the setup data file is to be used for the fully file-based setup (YES to the question of the step S102), information on nodes having the same GUIDs, if any, is changed to information in the set up data file (step S103). More specifically, the setup data file is searched for nodes having the same GUIDs as those of the nodes information on which is stored in the current buffer. As a result of the search, if there are found any nodes having the same GUIDs as those of the nodes information on which is stored in the current buffer, the attribute information and the connection information on the nodes are read out from the setup data file, and written over information on the corresponding nodes which is stored in the current buffer. In doing this, the connection information is overwritten in its entirety, whereas the attribute information has only a part thereof overwritten, which is configurable by the user (e.g. the number of logical terminals for use). The overwriting is carried out on all the nodes information on which is read out from the setup data file.

In the case shown in FIG. 16C, the nodes N1 and N2 are extracted as having the same GUID, and the connection information and attribute information only on these nodes N1 and N2 are overwritten by the contents of the setup data file. For example, the connection information on the node N1 defining the use of two logical terminals as shown in FIG. 16C is overwritten by the connection information defining the use of only one logical terminal, and the connection information on the node N2 defining the use of one logical terminal by the connection information defining the use of two logical terminals, as shown in FIG. 16D. As a result, the displayed screen is changed into one as shown in FIG. 16A.

Here, the DISABLE flags in the attribute information and so forth are not overwritten, so that the mode of display of the nodes remains the same as in the initial display. For example, when the node N1 is displayed in the ABLE mode in the initial display, even if the DISABLE flag of the node N1 is set to "1" in the setup data file, the node N1 is not changed in display into the DISABLE mode, but remains displayed in the ABLE mode.

In a step S104, nodes having GUIDs which are stored in the current buffer but not in the setup data file are changed into unused nodes. That is, the connections defined in the connection information, stored in the current buffer, on the nodes satisfying the above conditions that GUIDs are stored in the current buffer but not in the setup data file are all cancelled (i.e. rewritten as not connected). In the illustrated example in FIG. 16C, the nodes N3 and N4 satisfy the above conditions, so that as shown in FIG. 16A, the nodes N3 and N4 are changed into disconnected nodes without any lines indicative of connections. In this case, there is no change in the attribute information.

In a step S105, the fully file-based setup process is executed. Referring to FIG. 14, in the fully file-based setup process, first, the setup data file is searched for nodes to be added (step S111). That is, nodes (additional nodes) having GUIDs which are defined in the setup data file but not stored in the current buffer are searched for in the setup data file.

In a step S112, the additional nodes are added to the current buffer as nodes to be displayed in the DISABLE mode. That is, if any additional nodes are detected, the attribute information and the connection information on all the detected additional nodes are read from the setup data file, and added to the current buffer (additionally stored therein), and at the same time, the DISABLE flags of the attribute information stored in the current buffer are set to "1". In FIG. 16D, a node N10 corresponds to an additional node. Therefore, as shown in FIG. 16A, the attribute information and the connection information on the node N10 are added to the current buffer whereby the nodes N10 and N2 are connected by a line L210. Further, the DISABLE flag of the attribute information on the node N10 is set to "1", so that the node N10 is displayed as a non-existing node in the DISABLE mode (i.e. as a block gray in color enclosed by broken lines). It should be noted that the line L210 connected to the non-existing node N10 is also displayed in the DISABLE mode (i.e. in broken lines).

In the step S102 described above, if it is determined that the setup data file is to be used for the file-as-template setup (NO to the question of the step S102), if nodes having the same GUID exist, information thereon is changed to correspond to that in the setup data file (step S108). In a step S109, nodes having GUIDs which are stored in the current buffer but not in the setup data file are changed into unused nodes. The process described hitherto is no different from the fully file-based setup described hereinabove (see the steps S103 and S104).

In a step S110, the file-as-template setup process is executed. As shown in FIG. 15, in the file-as-template setup process, first, nodes to be added are searched for in the setup data file (step S121). That is, nodes (additional nodes) having GUIDs which are defined in the setup data file but not stored in the current buffer are searched for, in the setup data file. In the illustrated example in FIG. 16D, the node N10 corresponds to an additional node.

In a step S122, nodes to which information can be taken over are searched for in the current buffer. More specifically, nodes having the DISABLE flag thereof set to "0" (actually connected to the music system) and at the same time not in use (not connected) (such nodes will be referred to as "taking-over nodes") are searched for, in the current buffer.

In a step S123, it is determined whether or not there is any taking-over node. If it is determined that there is no taking-over node (NO to the question of the step S123), the process proceeds to a step S129, whereas if it is determined that there is any taking-over node (YES to the question of the step S129), a process (taking-over process) is executed in which information as described below (part of the attribute information and the connection information) on an additional node is taken over by the taking-over node. It should be noted that "taking over" in the present embodiment corresponds to writing the information on the additional node over the information on the taking-over node. The taking-over process is executed on the detected additional nodes, one by one. In the illustrated example in FIG. 16C, the node N3 corresponds to a taking-over node.

In the taking-over process, first, the attribute information and the connection information on one additional node is read out (step S124). That is, the detected additional nodes are taken out, one by one, in a predetermined order, e.g. in an order in which the additional nodes are stored, as an object information on which is to be taken over.

In a step S125, a taking-over node that can take over information on the additional node as the object information on which is to be taken over is searched for. That is, the current buffer is searched for a taking-over node having the same model ID as that defined in the attribute information on the additional node as the object (which is read out).

In a step S126, it is determined whether or not there is a taking-over node satisfying the above condition of the step S125. If there is a taking-over node satisfying the condition (YES to the question of the step S126), information on the additional node as the object is taken over by the taking-over node. In doing this, overwriting is performed on the entire connection information, and on only a part of data of the attribute information configurable by the user (e.g. the number of logical terminals for use).

In a step S128, it is determined whether or not there remains any additional node. If there remains an additional node (YES to the question of the step S128), the process returns to the step S124 to repeatedly execute the processing operations described above. If there remains no additional node (NO to the step S128), one or more additional nodes information on which has not been taken over is/are added to the current buffer as a node or nodes to be displayed in the DISABLE mode (step S129). That is, the attribute information and the connection information on one or more additional nodes which have not been taken over (all the additional nodes when there is no taking-over node from the beginning) are read out from the setup data file, and added to (additionally stored in) the current buffer, followed by setting the DISABLE flags in the attribute information to "1".

Referring again to FIG. 13A, in a step S106, the screen is updated based on the updated information stored in the current buffer. That is, based on the changed information stored in the current buffer, the node blocks and connection lines in the music system configuration screen are displayed again.

In a step S107, based on the updated information stored in the current buffer, the music system is updated. That is, the connection information and a part of the attribute information stored in the updated current buffer are transmitted to the corresponding actual nodes (having the same GUIDs), to thereby cause the nodes to update their statuses (of connections).

As descried, according to the present embodiment, based on the read setup data file, it is possible to update the logical music system configuration by the fully file-based setup or by the file-as-template setup, and the updated logical music system configuration is displayed on the screen such that an imaginary music system configuration and an actual music system configuration are displayed simultaneously and in respective different display modes so as to enable the user to visually discriminate between the two music system configurations. As a result, the user can easily recognize the imaginary music system configuration and the actual music system configuration. Further, when the setup data file has been read out, the configurations on (the connections of) non-existing nodes in the logical music system based on the read-out setup data file can be automatically taken over by existing nodes which satisfy predetermined conditions. As a result, it is possible to cause the configurations on (the connections of) non-existing nodes in the logical music system configuration read out from the setup data file to be easily and promptly taken over by existing or actual nodes.

By performing a predetermined designating operation on node blocks and lines of connection displayed on the music system configuration screen, it is possible to change the logical music system configuration by erasing nodes or changing connections. When such changes are carried out, pieces of information stored in the current buffer are rewritten according to the changes, and the updated information in the current buffer is reflected on the nodes constituting the music system. For example, the user can change the logical music system configuration by performing a desired operation on the music system configuration screen, such as adding a line for display or moving a line such that appropriate nodes are connected together, or overlaying a node block (non-existing node) displayed in the DISABLE mode on a node block (existing node) displayed in the ABLE mode.

It should be noted that when performing the file-as-template setup process, if there are a plurality of nodes (taking-over nodes) which can take over information on one additional node, it can be envisaged that a method of prompting the user to select one of the nodes or a method of automatically selecting one of the nodes according to a predetermined rule is used. Further, it can be envisaged that a means for presenting each of additional nodes is added to thereby enable the user to inhibit the taking-over of information even when there is a taking-over node.

It is to be understood that the object of the present invention may also be accomplished by supplying a computer or a CPU with a program code of software, which realizes the functions of either of the above described embodiments, and causing the computer or CPU to read out and execute the program code.

The above program has only to realize the functions either of the above described embodiments on a computer, and the form of the program may be an object code, a program code executed by an interpreter, or script data supplied to an OS.

Further, it is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

The present invention is not limited to the above described embodiments, but can be modified in various manners based on the subject matter of the present invention, which should not be excluded from within the scope of the present invention insofar as functions as recited in the appended claims or the functions performed by the construction either of the above described embodiments can be achieved.

What is claimed is:

1. A communication path setup computer for a music system including a plurality of pieces of music equipment connected to each other via communication lines, the communication path setup computer comprising:

a first storage device that stores connection information on the plurality of pieces of music equipment;

a display device that displays connection paths of the plurality of music equipment based on the connection information stored in the first storage unit;

a second storage device that stores a plurality of setup data files, each of the setup data files comprising connection information of the plurality of pieces of music equipment;

a selecting device that selects one of the plurality of setup data files;

a first overwriting device that writes the connection information of the music equipment in the selected setup data file over the connection information of a matching music equipment stored in the first storage device;

a first extracting device that identifies, from the selected setup data file, additional music equipment not matching any music equipment in the first storage device and extracts connection information of the additional music equipment;

a second extracting device that identifies, from the first storage device, taking-over music equipment not matching any music equipment in the selected setup data file and extracts connection information of the taking-over music equipment; and a second overwriting device that writes the connection information of the additional music equipment extracted by said first extracting device over the connection information of the taking-over music equipment extracted by said second extracting device, wherein, the second overwriting device does not write the connection information of the additional music equipment over any connection information in the first storage device if the second extracting device fails to identify any taking-over music equipment.

2. The communication path setup computer of claim 1, further comprising an updating device that updates the screen display of said displaying device displaying the connection information, based on the overwritten connection information in the first storage device.

3. A communication path setup method for a music system including a plurality of pieces of music equipment connected to each other via communication lines, the method comprising:

storing, in a first storage device, connection information on the plurality of pieces of music equipment;

displaying connection paths of the plurality of music equipment based on the connection information stored in the first storage device;

storing a plurality of setup data files, each of the setup data files comprising connection information of the plurality of pieces of music equipment;

selecting one file of the plurality of setup data files;

writing the connection information of the music equipment in the selected setup data file over the connection information of a matching music equipment stored in the first storage device;

identifying, from the selected setup data file, additional music equipment not matching any music equipment in the first storage device extracting connection information of the additional music equipment;

identifying, from the first storage device, taking-over music equipment not matching any music equipment in the selected setup data file;

extracting connection information of the taking-over music equipment; and writing the connection information of the additional music equipment over the connection information of the taking-over music equipment, wherein, the connection information of the additional music equipment is not written over any connection information in the first storage device if no taking-over music equipment is identified.

4. A non-transitory storage medium storing a program for causing a computer to execute a communication path setup method for a system including a plurality of pieces of music equipment connected to each other via communication lines, the system also including a first storage device and a display, the method comprising:

storing, in the first storage device, connection information on the plurality of pieces of music equipment;

displaying, on a display, connection paths of the plurality of music equipment based on the connection information stored in the first storage device;

storing a plurality of setup data files, each of the setup data files comprising connection information of the plurality of pieces of music equipment;

selecting one file of the plurality of setup data files;

writing the connection information of the music equipment in the selected setup data file over the connection information of a matching music equipment stored in the first storage device;

identifying, from the selected setup data file, additional music equipment not matching any music equipment in the first storage device extracting connection information of the additional music equipment;

identifying, from the first storage device, taking-over music equipment not matching any music equipment in the selected setup data file;

extracting connection information of the taking-over music equipment; and writing the connection information of the additional music equipment over the connection information of the taking-over music equipment, wherein, the connection information of the additional music equipment is not written over any connection information in the first storage device if no taking-over music equipment is identified.

* * * * *